US012432825B2

(12) United States Patent
Lee et al.

(10) Patent No.: US 12,432,825 B2
(45) Date of Patent: Sep. 30, 2025

(54) COOKING APPARATUS

(71) Applicant: SAMSUNG ELECTRONICS CO., LTD., Suwon-si (KR)

(72) Inventors: Changhyun Lee, Suwon-si (KR); Woojoo Kim, Suwon-si (KR); Chulwoo Lee, Suwon-si (KR); Seokang Kim, Suwon-si (KR); Yesil Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 744 days.

(21) Appl. No.: 17/734,242

(22) Filed: May 2, 2022

(65) Prior Publication Data

US 2023/0007741 A1 Jan. 5, 2023

Related U.S. Application Data

(63) Continuation of application No. PCT/KR2022/005386, filed on Apr. 14, 2022.

(30) Foreign Application Priority Data

Jul. 2, 2021 (KR) ........................ 10-2021-0087390
Jul. 26, 2021 (KR) ........................ 10-2021-0097944

(51) Int. Cl.
*H05B 6/64* (2006.01)
*F24C 7/02* (2006.01)
*F24C 15/20* (2006.01)

(52) U.S. Cl.
CPC ............. *H05B 6/6426* (2013.01); *F24C 7/02* (2013.01); *F24C 15/20* (2013.01); *H05B 6/6414* (2013.01)

(58) Field of Classification Search
CPC ........ F24C 15/007; F24C 15/02; F24C 15/20; F24C 7/02; F24C 7/085; H05B 6/6414; H05B 6/6423; H05B 6/6426
(Continued)

(56) References Cited

U.S. PATENT DOCUMENTS 6,515,266 B2 2/2003 Nasu et al.
6,670,594 B1 * 12/2003 Jeong .................. H05B 6/6429 219/400
(Continued)

FOREIGN PATENT DOCUMENTS

JP 3541353 7/2004
JP 3937591 6/2007
(Continued)

OTHER PUBLICATIONS

International Search Report dated Aug. 4, 2022 for International Application No. PCT/KR2022/005386.
(Continued)

*Primary Examiner* — Quang T Van
(74) *Attorney, Agent, or Firm* — STAAS & HALSEY LLP

(57) ABSTRACT

A cooking apparatus includes a main body including a cooking chamber, a door configured to open and close the cooking chamber of the main body, a wire inserted into the main body from an inside of the door, a service hole formed on an upper surface of the main body to allow access to the wire inserted into the inside of the main body, and a service panel removably mounted to the main body so as to open and close the service hole.

15 Claims, 25 Drawing Sheets

(58) Field of Classification Search
USPC ....... 219/678, 756, 757, 761, 720, 702, 681, 219/725, 739, 746; 126/275 E, 273 A, 126/299 R, 299 D, 21 A
See application file for complete search history.

(56) References Cited

U.S. PATENT DOCUMENTS

| | | | |
|---|---|---|---|
| 8,847,133 | B2 | 9/2014 | Lee |
| 9,000,338 | B2 | 4/2015 | Kimura et al. |
| 11,015,815 | B2 | 5/2021 | Yun et al. |

FOREIGN PATENT DOCUMENTS

| | | |
|---|---|---|
| JP | 2009-180430 | 8/2009 |
| JP | 4637188 | 2/2011 |
| KR | 20-1998-0021185 | 7/1998 |
| KR | 2000-0015568 | 3/2000 |
| KR | 10-2001-0060684 | 7/2001 |
| KR | 2002-0044461 | 6/2002 |
| KR | 10-0560217 | 3/2006 |
| KR | 10-2006-0033187 | 4/2006 |
| KR | 10-2008-0070410 | 7/2008 |
| KR | 10-0851640 | 8/2008 |
| KR | 10-2008-0095529 | 10/2008 |
| KR | 10-2011-0070451 | 6/2011 |
| KR | 10-1119094 | 3/2012 |
| KR | 10-2019-0120616 | 10/2019 |

OTHER PUBLICATIONS

Written Opinion of the International Searching Authority dated Aug. 4, 2022 for International Applicatioon No. PCT/KR2022/005386.
Korean Office Action issued Jul. 24, 2025 for Application No. 10-2006-0033187.

* cited by examiner

COOKING APPARATUS

CROSS-REFERENCE TO RELATED APPLICATION(S)

This application is a continuation application, under 35 U.S.C. § 111(a), of International Application No. PCT/KR2022/005386, filed on Apr. 14, 2022, which claims priority to Korean Patent Application No. 10-2021-0087390, filed on Jul. 2, 2021 and to Korean Patent Application No. 10-2021-0097944, filed on Jul. 26, 2021, in the Korean Intellectual Property Office, the disclosure of which is incorporated by reference herein in its entirety.

BACKGROUND

Field

The disclosure relates to a cooking apparatus and more particularly, to a cooking apparatus having improved usability.

Description of Related Art

A cooking apparatus is an appliance for heating and cooking an object to be cooked, such as food, and refers to a device capable of providing various functions related to cooking, such as heating, defrosting, drying, and sterilizing an object to be cooked. The cooking apparatus may include an oven such as a gas oven or an electric oven, a microwave heating device (hereinafter referred to as a microwave), a gas range, an electric range, and an Over The Range (OTR), a gas grill or an electric grill.

The OTR is a microwave that incorporates a hood function for ventilation in the kitchen, and the OTR may cook food more conveniently and efficiently while minimizing installation space. The OTR may be located above a cooking apparatus such as a gas range or a cooktop. That is, the OTR may be located in an upper portion of a cooking space.

In general, it is necessary to disassemble a door from a main body for maintenance of parts and the like of the cooking apparatus. In this case, disconnecting the wire in the door from the wire in the main body may be preceded. It may be required to completely disassemble the cooking apparatus to disconnect between these wires.

SUMMARY

In accordance with an aspect of the disclosure, a cooking apparatus includes a main body including a cooking chamber, an upper surface of the main body having a service hole formed thereon, a door configured to open and close the cooking chamber of the main body, a wire insertable into the main body from an inside of the door, the wire configured to electrically connect components of the cooking apparatus, and a service panel mountable to and removable from the main body so as to allow the service hole to be opened and closed, wherein while the wire is inserted into the main body, the wire is accessible through the service hole.

The cooking apparatus may further include a wire cover to cover the wire exposed between the door and the main body.

The door may include a door opening formed on a rear surface of the door to allow the wire to pass therethrough. An end of the wire cover may be coupled to the main body, and another end of the wire cover may be provided to be inserted into or withdrawn from the inside of the door through the door opening based on the opening and closing of the door.

The wire may correspond to a first wire, and the main body may accommodate a second wire connected to the first wire and configured to exchange a signal with the first wire.

The door may further include a manipulator configured to receive a user command. An end of the first wire may be connectable to the manipulator and another end of the first wire may be connectable to the second wire.

The cooking apparatus may further include a control assembly arranged in front of the main body and adjacent to an electronic equipment chamber formed inside the main body. An end of the second wire may be connectable to the first wire and another end of the second wire may be connectable to the control assembly.

The first wire and the second wire may be separable from each other through the service hole.

The main body may further include a circulation air inlet formed on a lower surface of the main body to suction air, and a filter configured to filter the air suctioned through the circulation air inlet. The service panel may further include a circulation air outlet provided to discharge the air that passes through the filter.

The main body may further include an electronic equipment chamber and a cooling air inlet formed on the upper surface of the main body to suction air for cooling the electronic equipment chamber. The cooling air inlet may be arranged in front of the circulation air outlet.

The cooling air inlet may correspond to a first cooling air inlet, and the cooking apparatus may further include a second cooling air inlet formed on a front surface of the electronic equipment chamber to allow air, which is suctioned through the first cooling air inlet, to be introduced into the electronic equipment chamber, a guide duct provided to allow the cooking chamber to communicate with the electronic equipment chamber so as to guide the air cooling the electronic equipment chamber to an inside of the cooking chamber, and a cooling air outlet formed on the upper surface of the main body to communicate with the cooking chamber so as to discharge the air cooling the cooking chamber.

The wire cover may include a curved shape so as not to interfere with the door.

The cooking apparatus may further include a hinge device configured to rotatably couple the door to the main body. The hinge device may include a hinge bracket provided on the main body to protrude toward the door, and a hinge shaft arranged inside the door and provided to form a rotation center of the hinge bracket by being rotatably coupled to the hinge bracket.

The door may further include a door cap arranged adjacent to the hinge device to prevent separation of the hinge device, and coupleable to and decouple from the rear surface of the door.

The hinge bracket may be coupleable to an end of the wire cover inside the main body.

The hinge shaft may further include a body and an extension formed to extend radially outward from an outer surface of the body. The hinge bracket may be rotatably coupled to the body of the hinge shaft and provided to support the extension.

In accordance with another aspect of the disclosure, a cooking apparatus includes a main body including a cooking chamber and an electronic equipment chamber separated from the cooking chamber and in which electronic components are arranged, a door configured to open and close the cooking chamber of the main body and including a manipulator configured to receive a user command, a control unit removably mounted to a front side of the electronic equipment chamber of the main body and configured to receive a signal from the manipulator so as to control the electronic components, a first wire extending from the manipulator of the door to an inside of the main body, a second wire arranged inside the main body and including one end connected to the first wire and the other end connected to the control unit, and a service hole formed on an upper surface of the main body to allow access to the inside of the main body to release connection between the first wire and the second wire.

The cooking apparatus may further include a service panel removably mounted to the upper surface of the main body so as to open and close the service hole.

The main body may further include a circulation air inlet formed on a lower surface of the main body to suction polluted air, and a filter provided to filter the air suctioned through the circulation air inlet. The service panel may further include a circulation air outlet provided to discharge air that passes through the filter.

The door may further include a door opening formed on a rear surface of the door to allow the first wire to pass therethrough. The main body may further include a body opening formed on a front surface of the main body to allow the first wire, which passes through the door opening, to be inserted into the inside of the main body.

The cooking apparatus may further include a wire cover provided to cover the first wire between the door opening and the body opening.

BRIEF DESCRIPTION OF THE DRAWINGS

The above and other aspects, features, and advantages of certain embodiments of the present disclosure will be more apparent from the following description taken in conjunction with the accompanying drawings of which.

DETAILED DESCRIPTION

Figure 1:
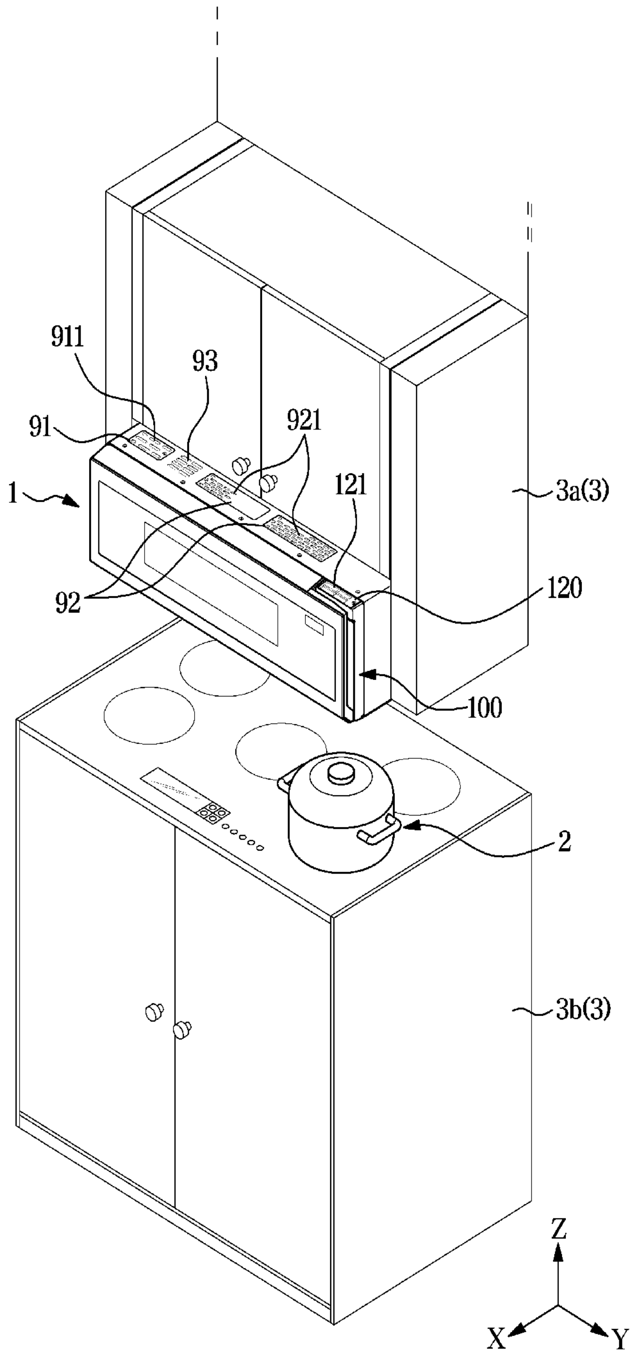
FIG. 1 is a perspective view illustrating a state in which a cooking apparatus according to an embodiment of the disclosure is installed.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms “a,” “an” and “the” are intended to include the plural forms as well, unless the context clearly indicates otherwise. In this disclosure, the terms “including”, “having”, and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Therefore, it is an aspect of the disclosure to provide a cooking apparatus including an improved structure to easily disconnect wires.

It is another aspect of the disclosure to provide a cooking apparatus capable of providing ease of maintenance and improved usability.

It is another aspect of the disclosure to provide a cooking apparatus capable of preventing wire exposure between a door and a main body.

Additional aspects of the disclosure will be set forth in part in the description which follows and, in part, will be obvious from the description, or may be learned by practice of the disclosure.

Hereinafter an embodiment according to the disclosure will be described in detail with reference to the accompanying drawings.

FIG. 1 is a perspective view illustrating a state in which a cooking apparatus according to an embodiment of the disclosure is installed.

Referring to FIG. 1, a first cooking apparatus 1 and a second cooking apparatus 2 may be installed in an indoor space. For example, the first and second cooking apparatuses 1 and 2 may be installed in a kitchen.

The first and second cooking apparatuses 1 and 2 may be installed on an external structure 3. The external structure 3 may include an upper cabinet 3*a* provided in an upper portion of the kitchen space and a lower cabinet 3*b* provided in a lower portion of the kitchen space. External structures according to the disclosure may collectively refer to cabinets, drawers, cupboards, walls W, and the like.

The first cooking apparatus 1 may be installed in the upper cabinet 3*a*. In the lower side of the first cooking apparatus 1, the second cooking apparatus 2 may be installed to be spaced apart from the first cooking apparatus 1 by a predetermined distance. For example, the second cooking apparatus may be installed in the lower cabinet 3*b*.

The first cooking apparatus 1 may be arranged above the second cooking apparatus 2. The first cooking apparatus 1 may suction exhaust gas, smoke, or food odor generated by the second cooking apparatus 2 and discharge the suctioned exhaust gas, smoke or food odor to the outside. For example, the first cooking apparatus 1 may perform a hood function. However, the function of the first cooking apparatus 1 is not limited thereto, and the first cooking apparatus 1 may cook food at a high frequency through a magnetron, or cook food through a heater.

Figure 2:
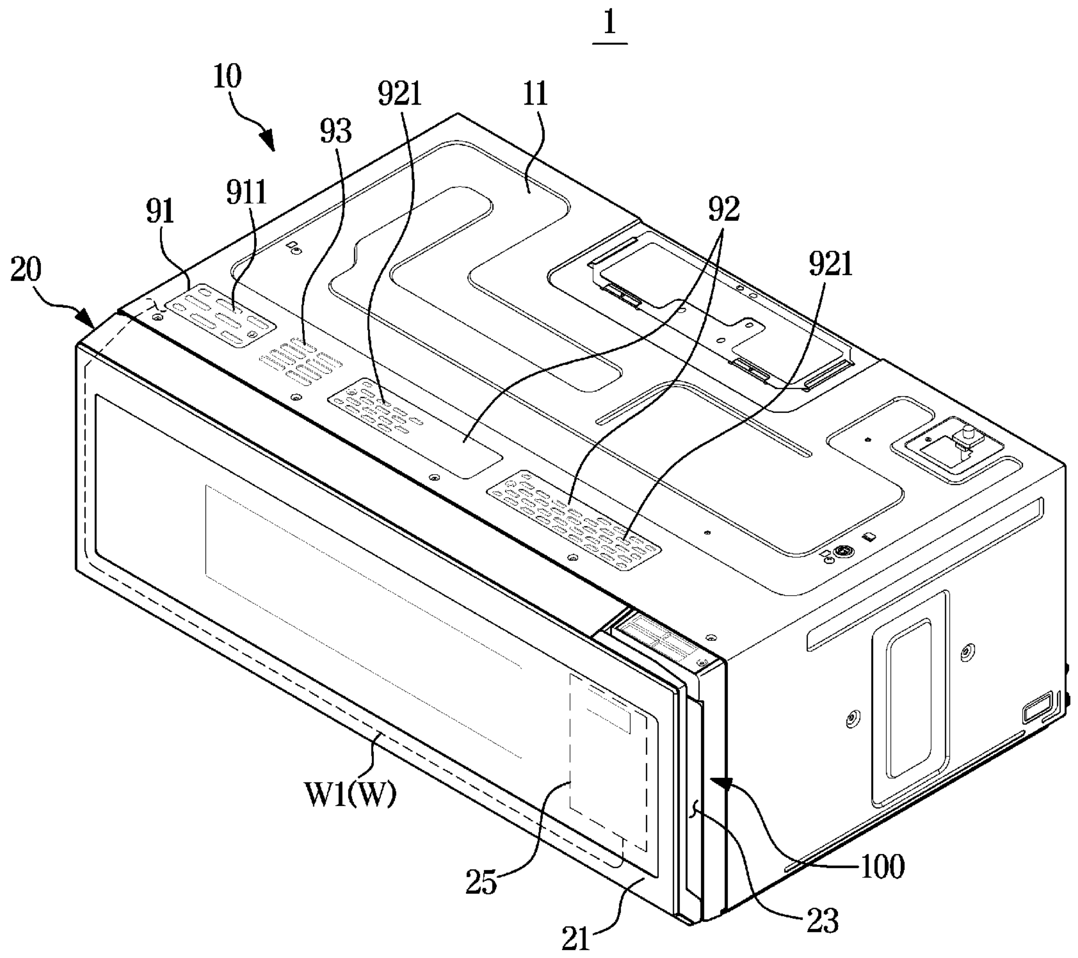
FIG. 2 is a perspective view illustrating the cooking apparatus according to an embodiment of the disclosure.
Figure 3:
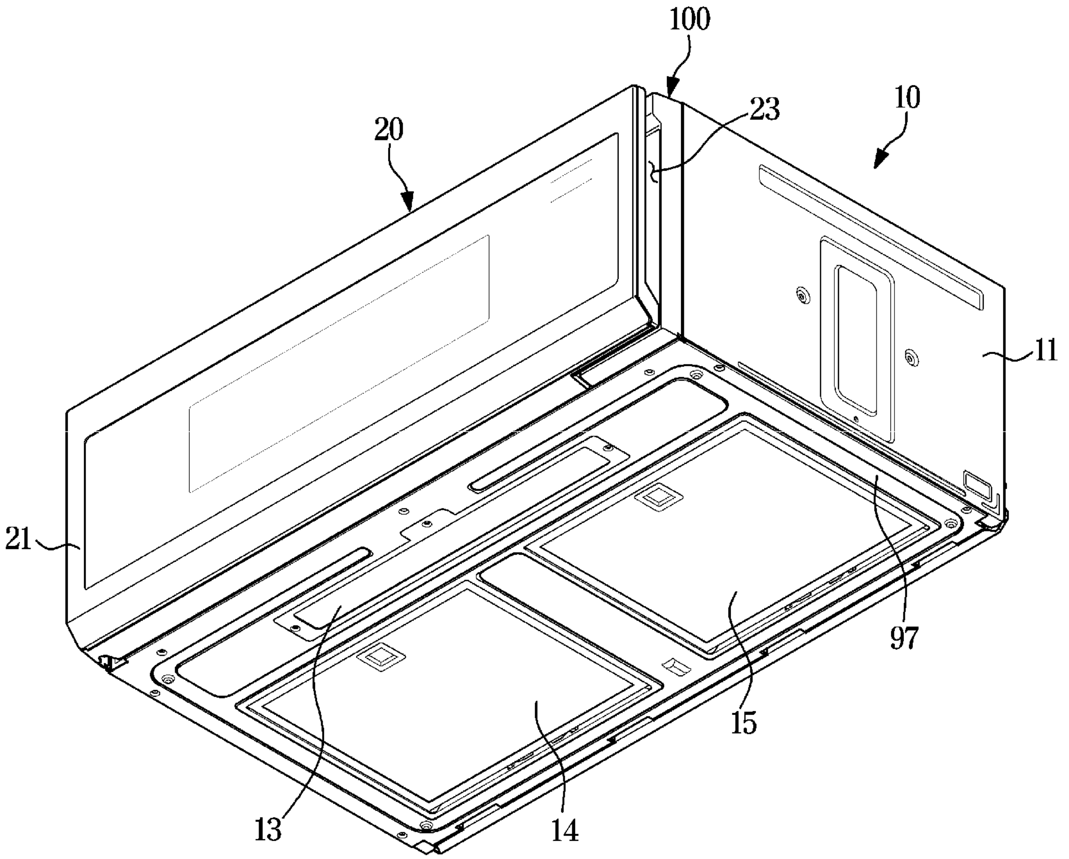
FIG. 3 is a bottom perspective view illustrating the cooking apparatus according to an embodiment of the disclosure.
Figure 4:
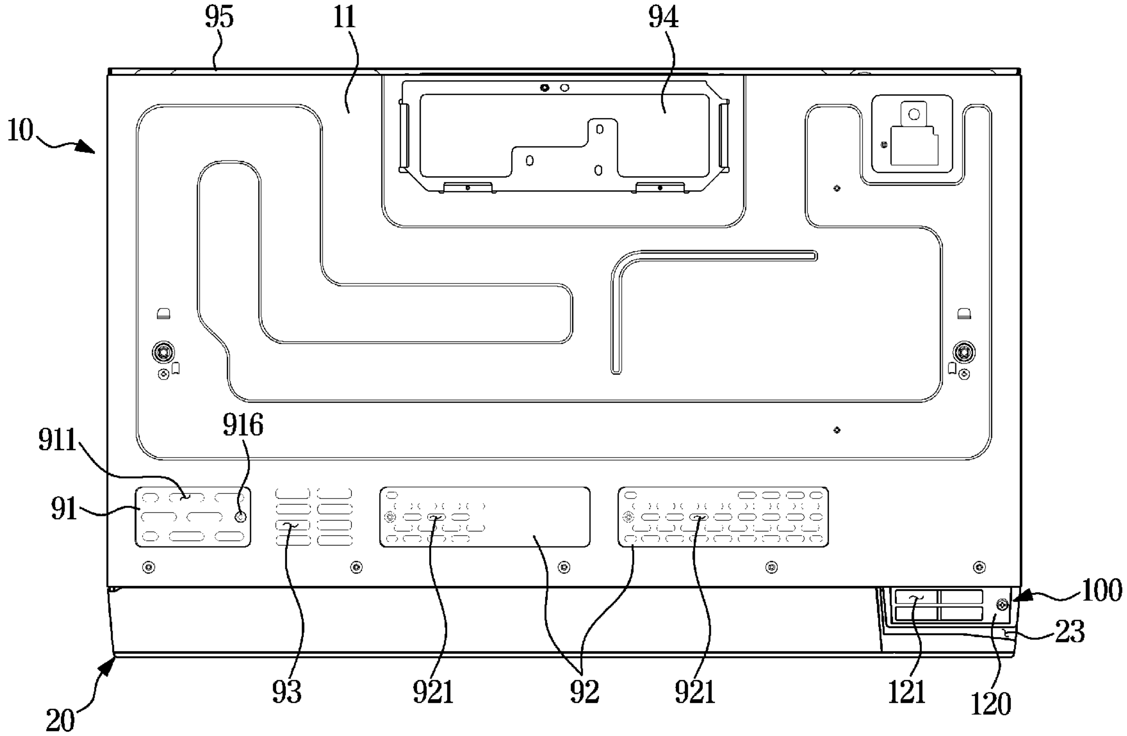
FIG. 4 is a top view illustrating the cooking apparatus according to an embodiment of the disclosure.
Figure 5:
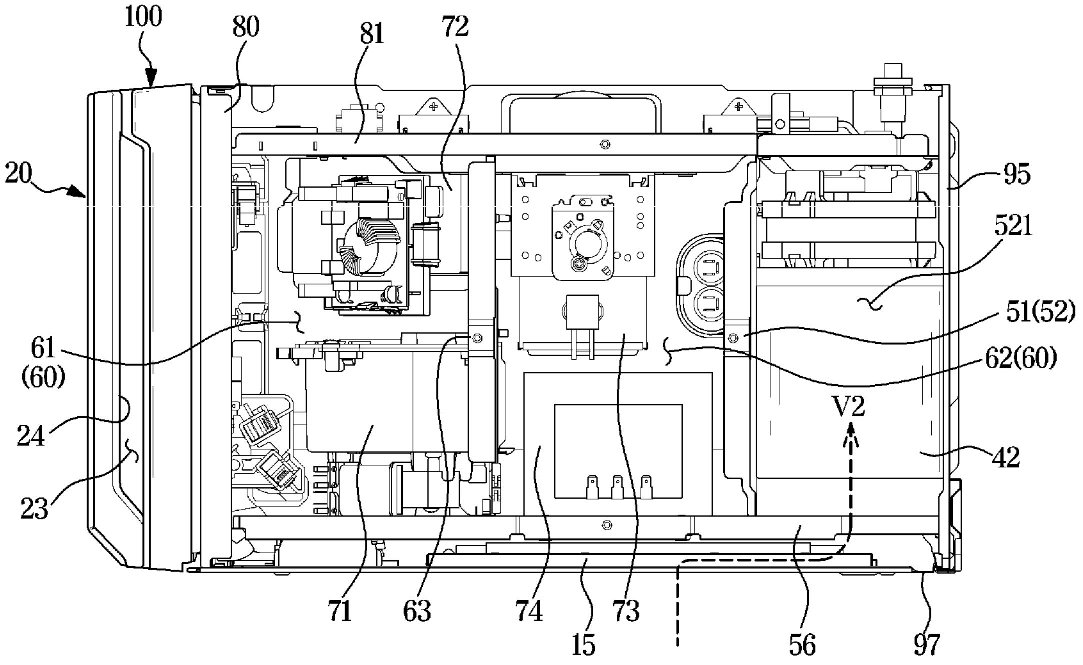
FIG. 5 is a side view illustrating one side of the cooking apparatus according to an embodiment of the disclosure in which an outer housing is removed.
Figure 6:
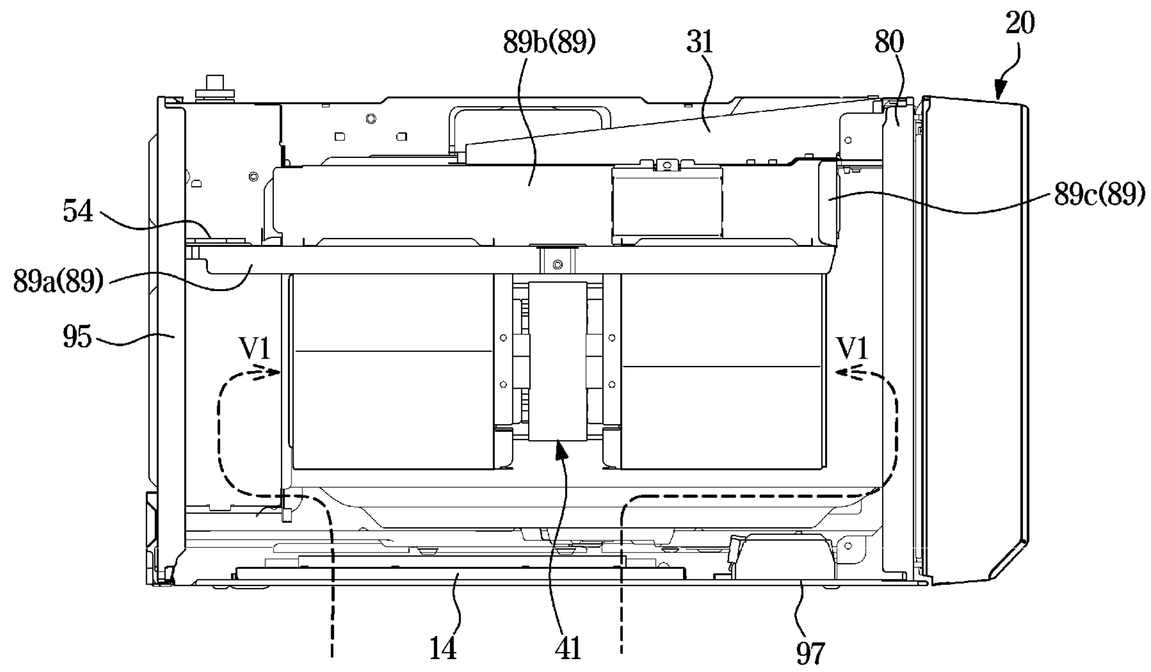
FIG. 6 is a side view illustrating the other side of the cooking apparatus according to an embodiment of the disclosure in which the outer housing is removed.

FIG. 2 is a perspective view illustrating the cooking apparatus according to an embodiment of the disclosure. FIG. 3 is a bottom perspective view illustrating the cooking apparatus according to an embodiment of the disclosure. FIG. 4 is a top view illustrating the cooking apparatus according to an embodiment of the disclosure. FIG. 5 is a side view illustrating one side of the cooking apparatus according to an embodiment of the disclosure in which an outer housing is removed. FIG. 6 is a side view illustrating the other side of the cooking apparatus according to an embodiment of the disclosure in which the outer housing is removed.

The first cooking apparatus 1 according to an embodiment of the disclosure may be provided as an oven the range (OTR). Hereinafter the first cooking apparatus 1 is referred to as the cooking apparatus 1.

Referring to FIGS. 2 and 3, the cooking apparatus 1 may include a main body 10 and a door 20 coupled to a front side of the main body 10. The cooking apparatus 1 may include a control unit 100 (also referred to as a control assembly 100) removably mounted to the front side of the main body 10.

The main body 10 may include an outer housing 11 and an inner housing 12 provided inside the outer housing 11. A cooking chamber 30 and an electronic equipment chamber 60 may be provided inside the inner housing 12. The cooking chamber 30 and the electronic equipment chamber 60 may be provided to be partitioned from each other.

The door 20 may be configured to open and close the cooking chamber 30. Particularly, the door 20 may be rotatably coupled to the main body 10.

A part of a rear portion of the door 20 may be recessed to cover a front side of the control unit 100. One side of the door 20 may be recessed inward from the rear side to accommodate the control unit 100.

A predetermined space 23 may be formed between the door 20 and the control unit 100. A user can open and close the door 20 by putting a hand into the predetermined space 23 and gripping a handle 24 of the door 20.

The cooking apparatus 1 may include the control unit 100 removably mounted to the front side of the main body 10. The front of the control unit 100 may be covered by the door 20. Particularly, the control unit 100 may be coupled to the main body 10 so as to be arranged between the door 20 and the main body 10.

Referring to FIG. 3, a first circulation air intake 14 and a second circulation air intake 15 may be formed on a lower surface of the main body 10. Particularly, the first circulation air intake 14 and the second circulation air intake 15 may be formed on a bottom plate 97 of the main body 10.

Polluted air generated at a lower side of the cooking apparatus 1 may be sucked into the cooking apparatus 1 through the first circulation air intake 14 and the second circulation air intake 15. The polluted air may include oil vapor, exhaust gas, smoke, foreign substances, and food odors generated in the cooking space. The first circulation air intake 14 may include a first circulation air inlet (not shown). The second circulation air intake 15 may include a second circulation air inlet (not shown).

The polluted air sucked into the inside of the cooking apparatus 1 may be filtered by a filter (not shown) inside the cooking apparatus 1 and discharged to the outside of the cooking apparatus 1. The filter may be arranged to correspond to the first circulation air intake 14 and the second circulation air intake 15. Details of circulation flow paths V1 and V2 will be described later.

The main body 10 may include a lighting unit 13. The lighting unit 13 may be arranged in front of the first circulation air intake 14 and the second circulation air intake 15. The lighting unit 13 may be provided to irradiate light to the lower side of the cooking apparatus 1 in a state in which a cooktop is installed under the cooking apparatus 1.

Referring to FIG. 4, a service panel 91 and a discharge panel 92 may be arranged on an upper surface of the main body 10. Particularly, the service panel 91 may be removably mounted on the upper surface of the outer housing 11. The discharge panel 92 may be removably mounted on the upper surface of the outer housing 11.

In addition, a ventilation duct panel 94 may be arranged on the upper surface of the main body 10. The ventilation duct panel 94 may be removably mounted to the outer housing 11.

Although it is illustrated that two discharge panels 92 are formed according to an embodiment of the disclosure, the number of discharge panels 92 is not limited thereto.

The service panel 91 may include a first circulation air outlet 911. Each discharge panel 92 may include a second circulation air outlet 921.

The polluted air introduced into the main body 10 through the first circulation air intake 14 and the second circulation air intake 15 formed on the lower surface of the main body 10 may be filtered, and then discharged to the outside of the cooking apparatus 1 through the first circulation air outlet 911 and the second circulation air outlet 921.

In the description of the cooking apparatus 1 according to an embodiment of the disclosure described above, it has been described that the first circulation air outlet 911 and the second circulation air outlet 921 are formed in the service panel 91 and the discharge panel 92, and the filtered air is discharged into the indoor through the upper surface of the cooking apparatus 1.

However, the disclosure is not limited thereto, and in a state in which a separate communication duct (not shown) connected to the outdoor is provided in a space in which the cooking apparatus 1 is mounted, the service panel 91 may not include the first circulation air outlet 911, and the discharge panel 92 may also not include the second circulation air outlet 921.

Alternatively, a circulation air outlet (not shown) provided to communicate with the communication duct may be formed in the ventilation duct panel 94. In this case, the oil vapor introduced into the first circulation air intake 14 and the second circulation air intake 15 may be filtered and moved to the communication duct through the ventilation duct panel 94 of a rear upper surface of the cooking apparatus 1, thereby being discharged to the outdoor.

In other words, the circulation air outlet may be formed in the ventilation duct panel 94 while the first circulation air outlet 911 is not formed in the service panel 91 and the second circulation air outlet 921 is not formed in the discharge panel 92. Accordingly, all the filtered oil vapor may be discharged to the outdoor without being discharged to the indoor.

Accordingly, it is possible to keep the indoor air cleaner and because a temperature of cooling air introduced through a cooling flow path C, which will be described later, is lower, it is possible to increase the cooling efficiency of the cooking apparatus 1.

Further, because the service panel 91, the discharge panel 92 and the ventilation duct panel 94 are detachably installed in the outer housing 11, the service panel 91, the discharge panel 92, and the ventilation duct panel 94 may be mounted on the outer housing 11 as necessary.

Particularly, when it is required to discharge the filtered air to the indoor because the separate communication duct (not shown) is not provided, the service panel 91 and the discharge panel 92 including the circulation air outlet may be mounted on the outer housing 11, and the ventilation duct panel 94 without the circulation air outlet may be mounted on the outer housing 11.

Conversely, when it is not required to discharge the filtered air to the indoor because the separate communication duct (not shown) is provided, the service panel 91 and the discharge panel 92 without the circulation air outlet, respectively may be mounted on the outer housing 11 and the ventilation duct panel 94 including the circulation air outlet may be mounted on the outer housing 11.

The control unit 100 may include a suction grille 120 provided to cover an upper portion of the control unit 100.

The suction grille 120 may be arranged on the front side of the discharge panel 92. Particularly, the suction grille 120 may be accommodated in a recessed portion of the door 20, and the suction grille 120 may be arranged on one side of the door 20 to be in parallel with the door 20. In this case, the suction grille 120 may be arranged behind a part of the door 20.

Air outside the cooking apparatus 1 may be introduced into the main body 10 through the suction grille 120. The suction grille 120 may include a first cooling air inlet 121. Accordingly, the first cooling air inlet 121 may be formed in the suction grille 120 to allow air to be introduced therethrough so as to cool the electronic equipment chamber 60.

The air introduced through the suction grille 120 may cool the electronic equipment chamber 60 and then flow back into the cooking chamber 30 to cool a rear surface of the door 20 and then be discharged to a cooling air outlet 93 formed on the upper surface of the main body 10. Particularly, the cooling air outlet 93 may be formed by cutting a portion of the upper surface of the outer housing 11.

Referring to FIG. 5, the inner housing 12 of the main body 10 may include an upper plate 81 and a front plate 80. The upper plate 81 may form an upper surface of the inner housing 12. The front plate 80 may form a front surface of the main body 10. The front plate 80 may form a front surface of the inner housing 12.

The control unit 100 may be mounted to the front of the front plate 80. The electronic equipment chamber 60 may be provided at the rear of the front plate 80.

The electronic equipment chamber 60 may include a first electronic equipment chamber 61 and a second electronic equipment chamber 62. Various electronic components may be arranged in the electronic equipment chamber 60.

In the main body 10, the electronic equipment chamber 60 may be provided to be partitioned by the front plate 80, the upper plate 81, a cooling divider 51, and a circulation plate 56. Further, the electronic equipment chamber 60 may be divided into two spaces by a partition plate 63 that defines the first electronic equipment chamber 61 and the second electronic equipment chamber 62.

The circulation plate 56 may form a bottom surface of the electronic equipment chamber 60. The circulation plate 56 may be provided to be spaced apart from the bottom plate 97 of the outer housing 11.

The cooling divider 51 may be arranged above the circulation plate 56 and include a vertically extending shape. The cooling divider 51 may be provided as one surface of a rear bracket 52 to be described later. For example, the cooling divider 51 may correspond to one surface facing the partition plate 63 of the rear bracket 52.

Because the electronic equipment chamber 60 is partitioned by the circulation plate 56 and the cooling divider 51, the oil vapor introduced through the second circulation air intake 15 formed on the lower surface of the main body 10 may not be introduced into the electronic equipment chamber 60. Accordingly, it is possible to protect components arranged inside the electronic equipment chamber 60 from oil vapor or other foreign substances.

A cooling fan 71 may be accommodated in the first electronic equipment chamber 61. The cooling fan 71 may form air flow to allow external air to be introduced into the suction grille 120.

In addition, because the control unit 100 is mounted on the front plate 80 to communicate with the first electronic equipment chamber 61, the air introduced into the suction grille 120 may cool the control unit 100. Details thereof will be described later.

A magnetron 73 and a transformer 74 may be accommodated in the second electronic equipment chamber 62. The magnetron 73 and the transformer 74 may be configured to generate a high frequency. The generated high frequency may be supplied to the inside of the cooking chamber 30 to heat an object to be cooked.

The partition plate 63 provided to define the first electronic equipment chamber 61 and the second electronic equipment chamber 62 may be partially opened. The partition plate 63 may include a lower opening (not shown) communicating with the cooling fan 71 to allow air, which is sucked into the suction grille 120 by the cooling fan 71, to be introduced into the second electronic equipment chamber 62 through the first electronic equipment chamber 61. Further, the partition plate 63 may include an upper opening (not shown) with which the second electronic equipment chamber 62 and a guide duct 72 communicate.

The air introduced into the second electronic equipment chamber 62 may cool the transformer 74 and the magnetron 73, and then flow into the guide duct 72 mounted on the partition plate 63. The guide duct 72 may be arranged in the first electronic equipment chamber 61 to form a space with which the second electronic equipment chamber 62 and the inside of the cooking chamber 30 communicate.

Accordingly, the air flowing to the guide duct 72 may flow into the cooking chamber 30 to cool the rear surface of the door 20. Thereafter, the air may flow into an exhaust duct 31 communicating with the upper surface of the cooking chamber 30, and be discharged to the outside of the cooking apparatus 1 through the cooling air outlet 93 communicating with the exhaust duct 31.

In addition to the cooling flow path C provided to cool the electronic equipment chamber 60 and the door 20, the cooking apparatus 1 may include circulation flow paths V1 and V2 provided to suck and filter polluted air including oil vapor and to discharge the filtered air.

Referring to FIGS. 5 and 6, the cooking apparatus 1 may include circulation fans 41 and 42 configured to generate a suction force to suction polluted air. For example, the circulation fans 41 and 42 may include a first circulation fan 41 and a second circulation fan 42 provided on both sides with the cooking chamber 30 interposed therebetween. Because the first circulation fan 41 and the second circulation fan 42 are arranged on opposite sides in the inside of the main body 10, it is possible to reduce an overall height of the main body 10, and to secure a wider kitchen space.

Further, in the cooking apparatus 1, the plurality of circulation flow paths V1 and V2 including a first circulation flow path V1 flowing by the first circulation fan 41 and a second circulation flow path V2 flowing by the second circulation fan 42 may be formed. Details thereof will be described later.

The cooking apparatus 1 may include the rear bracket 52. The rear bracket 52 may include a circulation fan receiver 521 provided to accommodate the second circulation fan 42.

One surface (the cooling divider 51) of the rear bracket 52 which faces the electronic equipment chamber 60 may be provided to define the electronic equipment chamber 60 and the circulation fan receiver 521. The electronic equipment chamber 60 and the circulation fan receiver 521 may not communicate with each other. The rear bracket 52 may include a communicator 522 provided to be opened to communicate with the circulation fan receiver 521. According to a shape of the rear bracket 52, the air introduced through the second circulation air intake 15 may flow to the inside of the main body 10 along the circulation flow path V2.

The first circulation fan 41 may generate a suction force to allow air to be introduced into the first circulation air intake 14 formed on the bottom plate 97. A side plate 89 of the inner housing 12 may be mounted in an upper side of the first circulation fan 41. A portion of the side plate 89 may be cut to allow the introduced air to flow to the upper side of the first circulation fan 41.

The second circulation fan 42 may generate a suction force to allow air to be introduced into the second circulation air intake 15 formed on the bottom plate 97. The second circulation fan 42 may be arranged in the circulation fan receiver 521 of the rear bracket 52. The air introduced through the second circulating air intake 15 may move along the rear of the main body 10 through the communicator 522 of the rear bracket 52, and then flow to the upper side of the inner housing 12.

Figure 7:
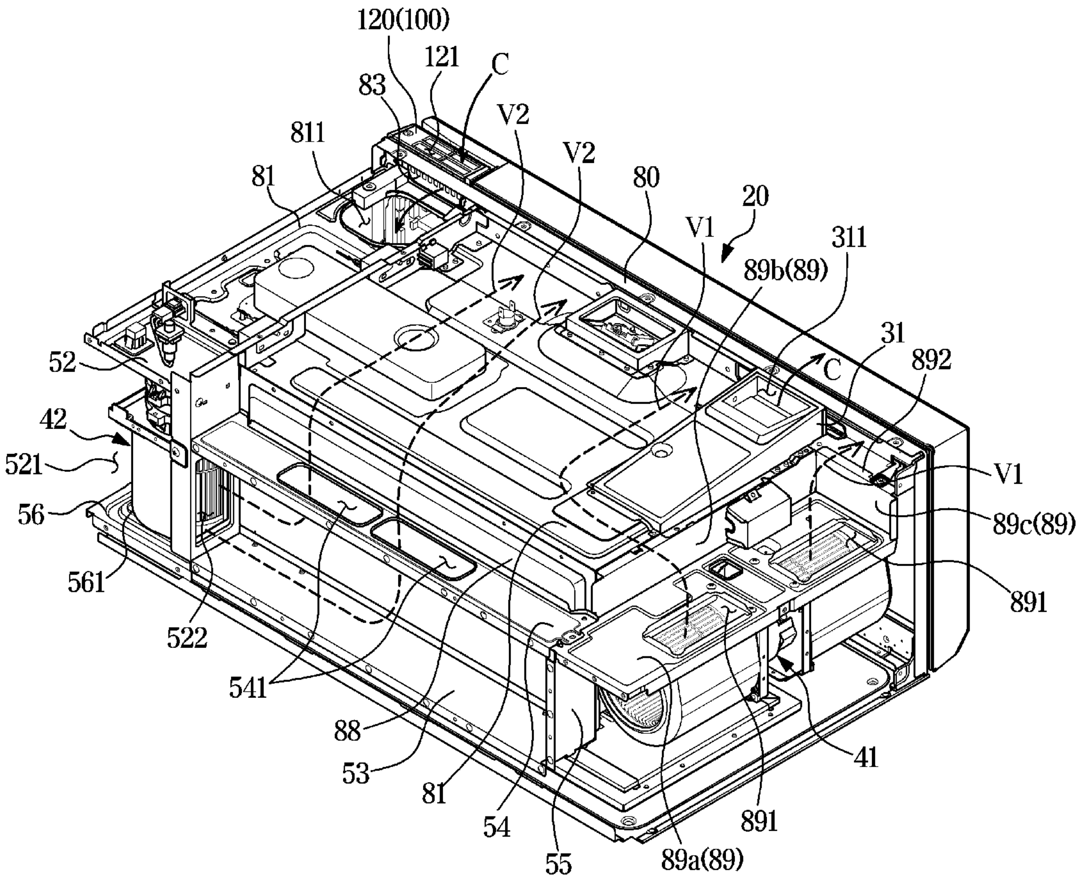
FIG. 7 is a rear perspective view illustrating air flow in a state in which the outer housing is removed from the cooking apparatus according to an embodiment of the disclosure.
Figure 8:
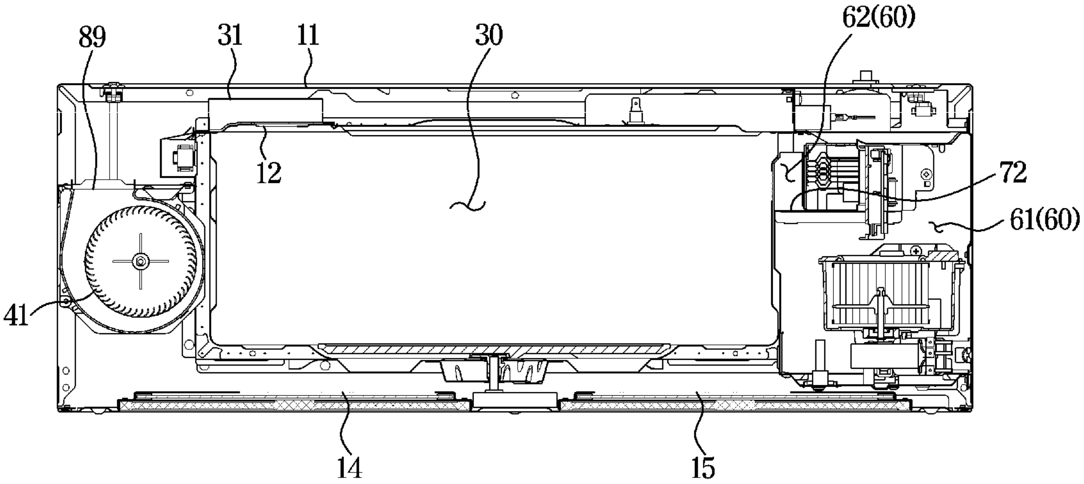
FIG. 8 is a cross-sectional view illustrating the cooking apparatus according to an embodiment of the disclosure.

FIG. 7 is a rear perspective view illustrating air flow in a state in which the outer housing is removed from the cooking apparatus according to an embodiment of the disclosure. FIG. 8 is a cross-sectional view illustrating the cooking apparatus according to an embodiment of the disclosure.

Hereinafter the first circulation flow path V1, the second circulation flow path V2, and the cooling flow path C of the cooking apparatus 1 according to an embodiment of the disclosure will be described.

Referring to FIGS. 6 and 7, air may be introduced into the main body 10 through the first circulation air intake 14 formed in the lower portion of the main body 10. The introduced air may be polluted air containing oil vapor.

The introduced air may be filtered and pass through the first circulation fan 41. The air passing through the first circulation fan 41 may flow to the side plate 89 arranged above the first circulation fan 41.

The side plate 89 may include a first communication hole 891. Air passing the first circulation fan 41 through the first communication hole 891 may flow to the upper portion of the inner housing 12.

The flowing air may be discharged again to the outside of the cooking apparatus 1 through the first circulation air outlet 911 and the second circulation air outlet 921 formed in the front upper portion of the main body 10 as shown in FIG. 3. This may be referred to as the first circulation flow path V1.

Alternatively, in a state in which a separate communication duct is provided to discharge the filtered oil vapor to the outdoor, the air introduced into the first circulation air intake 14 may be discharged to the outside of the cooking apparatus 1 by passing through the circulation air outlet formed in the ventilation duct panel 94, as described above.

Referring to FIGS. 5 and 7, air may be introduced into the main body 10 through the second circulation air intake 15 formed at the lower portion of the main body 10. The introduced air may also be polluted air containing oil vapor.

The introduced air may be filtered and pass through the second circulation fan 42. Particularly, the air may be introduced into the circulation fan receiver 521 of the rear bracket 52 through a through hole 561 formed in the circulation plate 56.

The communicator 522 of the rear bracket 52 may be formed in a portion defining between a back plate 95 of the outer housing 11 and a rear plate 88 of the inner housing 12. Therefore, the air introduced into the through hole 561 may flow to the rear of the inner housing 12 through the communicator 522.

The cooking apparatus 1 may include a bottom bracket 53, a partition bracket 54, and a circulation divider 55.

The bottom bracket 53 and the partition bracket 54 may be arranged between the outer housing 11 and the inner housing 12. Particularly, the bottom bracket 53 and the partition bracket 54 may be arranged at the rear of the inner housing 12 and extend horizontally. The partition bracket 54 may be arranged above the bottom bracket 53 to face the partition bracket 54.

The circulation divider 55 may be arranged between the outer housing 11 and the inner housing 12. Particularly, the circulation divider 55 may be arranged at the rear of the inner housing 12 and extend vertically. That is, the circulation divider 55 may be arranged to face the communicator 522 of the rear bracket 52.

The partition bracket 54 may include a second communication hole 541. The second communication hole 541 may be formed by cutting a part of the partition bracket 54. The second communication hole 541 may be provided to allow air to flow.

Accordingly, the rear bracket 52, the bottom bracket 53, the partition bracket 54, and the circulation divider 55 may be provided to form a part of a flow path through which the air introduced into the second circulation air intake 15 flows.

The air introduced into the second circulation air intake 15 may pass through the through hole 561 of the circulation plate 56, pass through the second circulation fan 42, pass through the communicator 522 of the rear bracket 52, and then flow between the bottom bracket 53 and the partition bracket 54.

In this case, the circulation divider 55 may be closed without an opening and arranged between the partition bracket 54 and the bottom bracket 53. Accordingly, the flowing air may flow to the upper rear side of the inner housing 12 through the second communication hole 541 of the partition bracket 54.

The air flowing to the upper side of the inner housing 12 through the second communication hole 541 may be discharged again to the outside of the cooking apparatus 1 through the first circulation air outlet 911 and the second circulation air outlet 921 formed in the upper front portion of the main body 10. This may be referred to as the second circulation flow path V2.

Alternatively, in a state in which a separate communication duct is provided to discharge the filtered oil vapor to the outdoor, the air introduced into the second circulation air intake 15 may be discharged to the outside of the cooking apparatus 1 by passing through the circulation air outlet formed in the ventilation duct panel 94, as described above.

Because the circulation divider 55 is provided to be closed, the air introduced by the first circulation fan 41 and the air introduced by the second circulation fan 42 may be separately moved in the lower portion of the inner housing 12, and then mixed in the upper portion of the inner housing 12.

Referring to FIGS. 7 and 8, the air introduced into the suction grille 120 arranged on the upper portion of the control unit 100 may flow into the first electronic equipment chamber 61 and the second electronic equipment chamber 62 to cool various electronic components. Particularly, the air introduced into the first cooling air inlet 121 of the suction grille 120 may be introduced into the inside of the main body 10 through the second cooling air inlet 83 of the front plate 80. Thereafter, the air may be introduced into the electronic equipment chamber 60 through a cutout 811 formed in the upper plate 81 of the inner housing 12.

The air introduced into the first electronic equipment chamber 61 may be introduced into the second electronic equipment chamber 62 through the cooling fan 71, and the air introduced into the second electronic equipment chamber 62 may be guided into the cooking chamber 30 by the guide duct 72 provided to communicate with a side surface of the cooking chamber 30. The air guided into the cooking chamber 30 may cool the rear surface of the door 20 and then flow to the exhaust duct 31 communicating with the upper surface of the cooking chamber 30. The exhaust duct 31 may be provided to communicate with the cooling air outlet 93. Accordingly, the air that completes the cooling may be discharged to the outside of the cooking apparatus 1 through the cooling air outlet 93. This may be referred to as the cooling flow path C.

Figure 9:
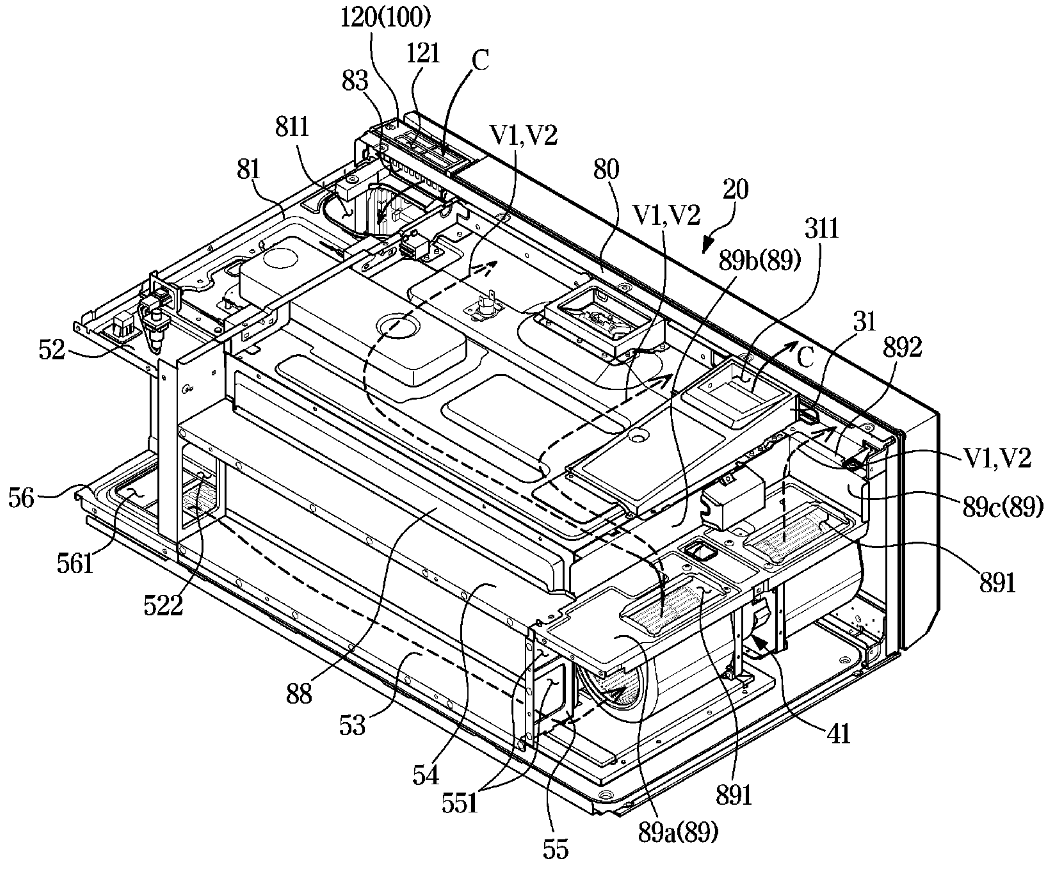
FIG. 9 is a rear perspective view illustrating air flow in a state in which an outer housing is removed from a cooking apparatus according to another embodiment of the disclosure.

FIG. 9 is a rear perspective view illustrating air flow in a state in which an outer housing is removed from a cooking apparatus according to another embodiment of the disclosure.

A cooking apparatus according to another embodiment of the disclosure may include a single circulation fan 41 unlike the cooking apparatus 1 according to an embodiment of the disclosure. Particularly, the cooking apparatus according to another embodiment may include only the first circulation fan 41.

Further, the cooking apparatus according to another embodiment of the disclosure includes the same configuration as the cooking apparatus 1 according to an embodiment of the disclosure, except that the configuration of the circulation divider 55 and the partition bracket 54 is different. The same components may include the same reference numerals and thus a description the same as the above-described cooking apparatus 1 will be omitted.

The cooking apparatus according to another embodiment of the disclosure may include the first circulation fan 41 arranged between the inner housing 12 and the outer housing 11. Air may be sucked into the first circulation air inlet and the second circulation air inlet through the first circulation fan 41.

Particularly, the air introduced into the first circulation air inlet may pass through the first communication hole 891 of the side plate 89 by passing through the first circulation fan 41. The air passing through the first communication hole 891 may be discharged to the outside of the cooking apparatus through the first circulation air outlet 911 of the service panel 91 and the second circulation air outlet 921 of the discharge panel 92.

Alternatively, in a state in which a separate communication duct (not shown) is provided to discharge the filtered oil vapor to the outdoor, the air introduced into the first circulation air inlet may be discharged to the outside of the cooking apparatus by passing through the circulation air outlet formed in the ventilation duct panel 94, as described above.

However, the air introduced into the second circulation air inlet may pass through the through hole 561 of the circulation plate 56 and the communicator 522 of the rear bracket 52, and then flow into a space between the partition bracket 54 and the bottom bracket 53.

In this case, the partition bracket 54 may be provided to be closed without an opening. Particularly, unlike the cooking apparatus 1 according to an embodiment of the disclosure, the second communication hole 541 may not be formed in the partition bracket 54.

However, the partition bracket 54 may be closed and the second communication hole 551 may be formed in the circulation divider 55. Accordingly, the air introduced into the second circulation air inlet may flow into the space between the partition bracket 54 and the bottom bracket 53, and flow to the first circulation fan 41 by passing through the second communication hole 551 of the circulation divider 55.

Thereafter, the air passing through the first circulation fan 41 may flow to the upper portion of the inner housing 12 through the first communication hole 891 of the side plate 89. The flowing air may be discharged to the outside of the cooking apparatus through the first circulation air outlet 911 of the service panel 91 and the second circulation air outlet 921 of the discharge panel 92.

Alternatively, in a state in which a separate communication duct (not shown) is provided to discharge the filtered oil vapor to the outdoor, the air introduced into the second circulation air inlet may be discharged to the outside of the cooking apparatus by passing through the circulation air outlet formed in the ventilation duct panel 94, as described above.

Unlike the cooking apparatus 1 according to the embodiment of the disclosure, by closing the partition bracket 54 and by opening the circulation divider 55, the cooking apparatus according to another embodiment of the disclosure may suction air through the first circulation air inlet and the second circulation air inlet by using only the suction force of the first circulation fan 41.

Therefore, as the cooking apparatus is manufactured with a simpler structure, the manufacturing cost may be reduced. In addition, because it is possible to replace only the configuration of the partition bracket 54 and the circulation divider 55 according to the needs of the user, there is no need the complex internal design according to the number of circulation fans.

Figure 10:
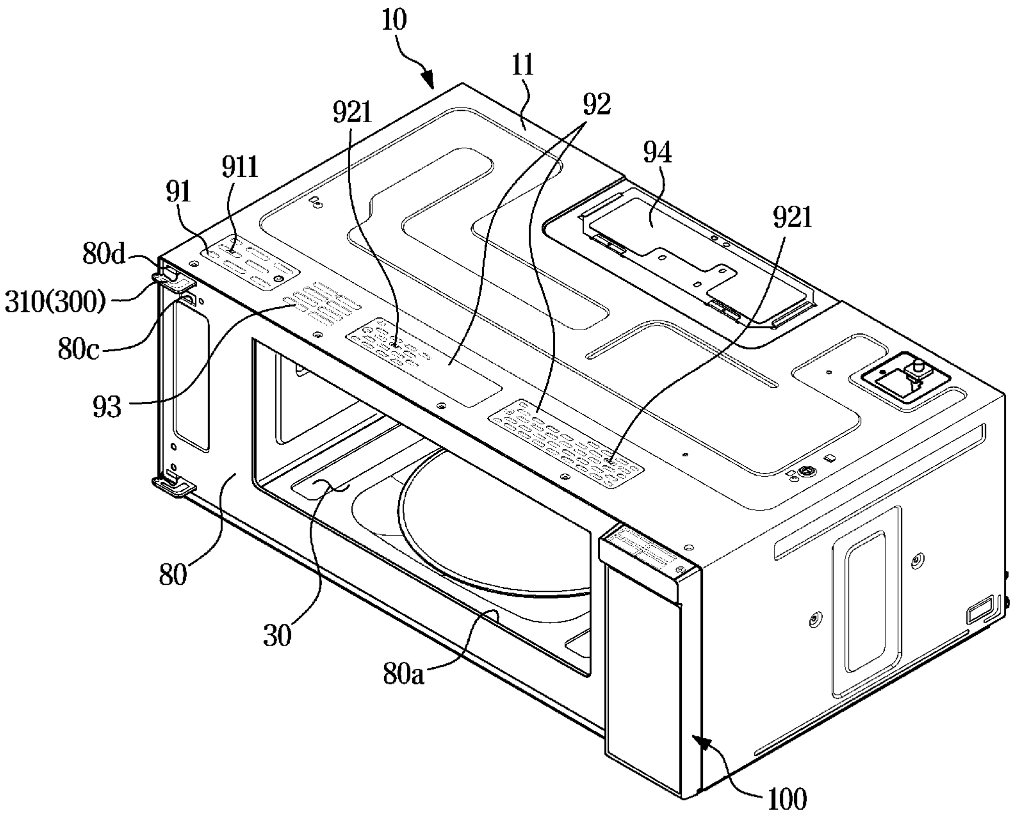
FIG. 10 is a view illustrating a state in which a control unit is coupled to a main body of the cooking apparatus according to an embodiment of the disclosure.
Figure 11:
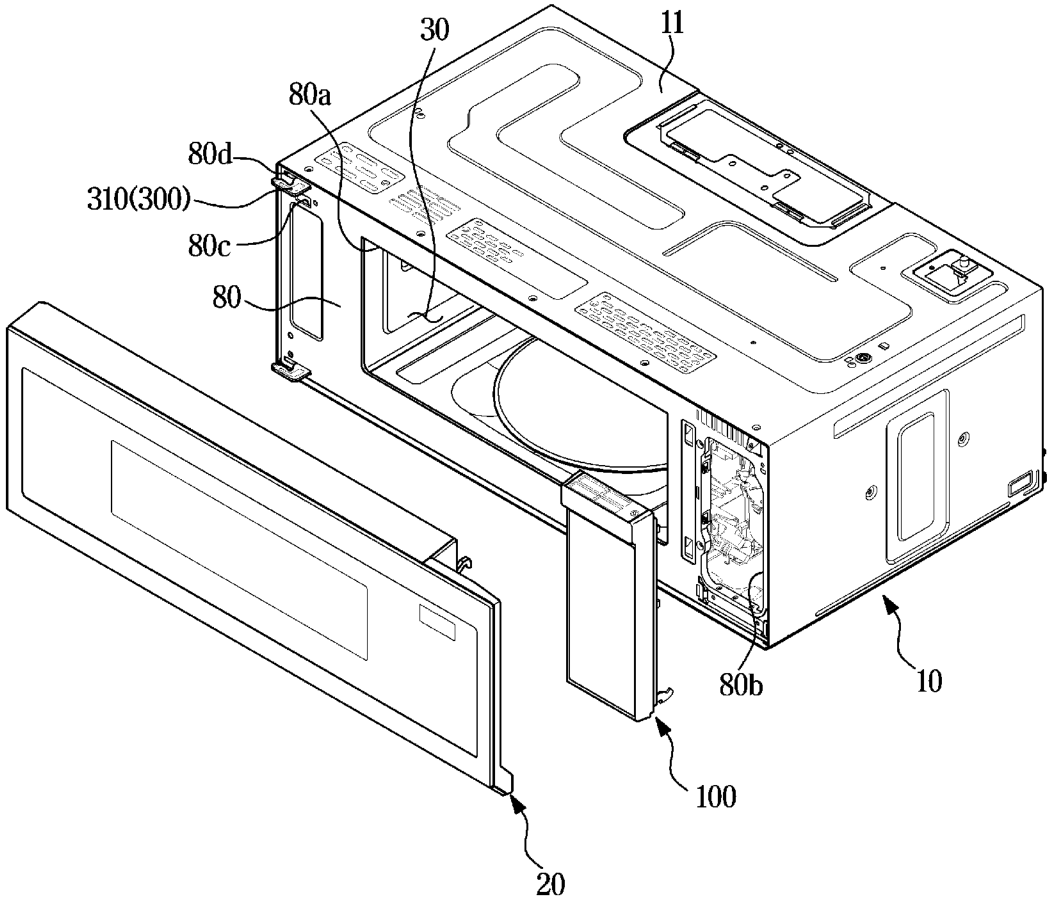
FIG. 11 is an exploded perspective view illustrating a door, the control unit, and the main body of the cooking apparatus according to an embodiment of the disclosure.
Figure 12:
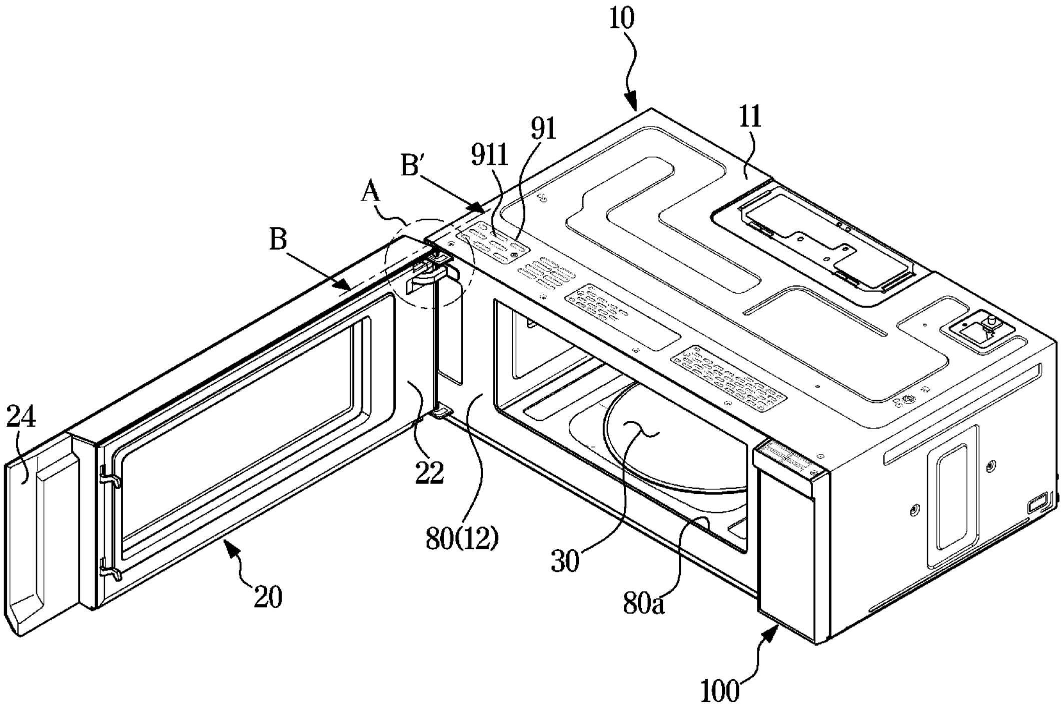
FIG. 12 is a view illustrating a state in which the door of the cooking apparatus according to an embodiment of the disclosure is opened.
Figure 13:
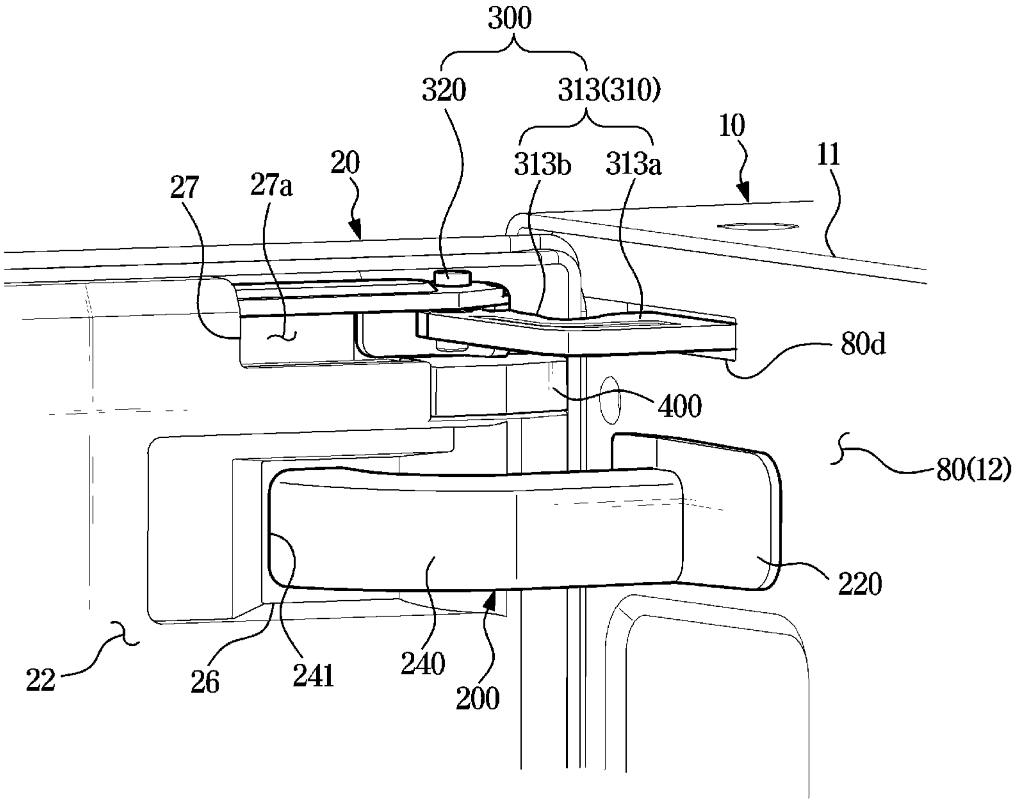
FIG. 13 is an enlarged view illustrating a part A illustrated in FIG. 12.
Figure 14:
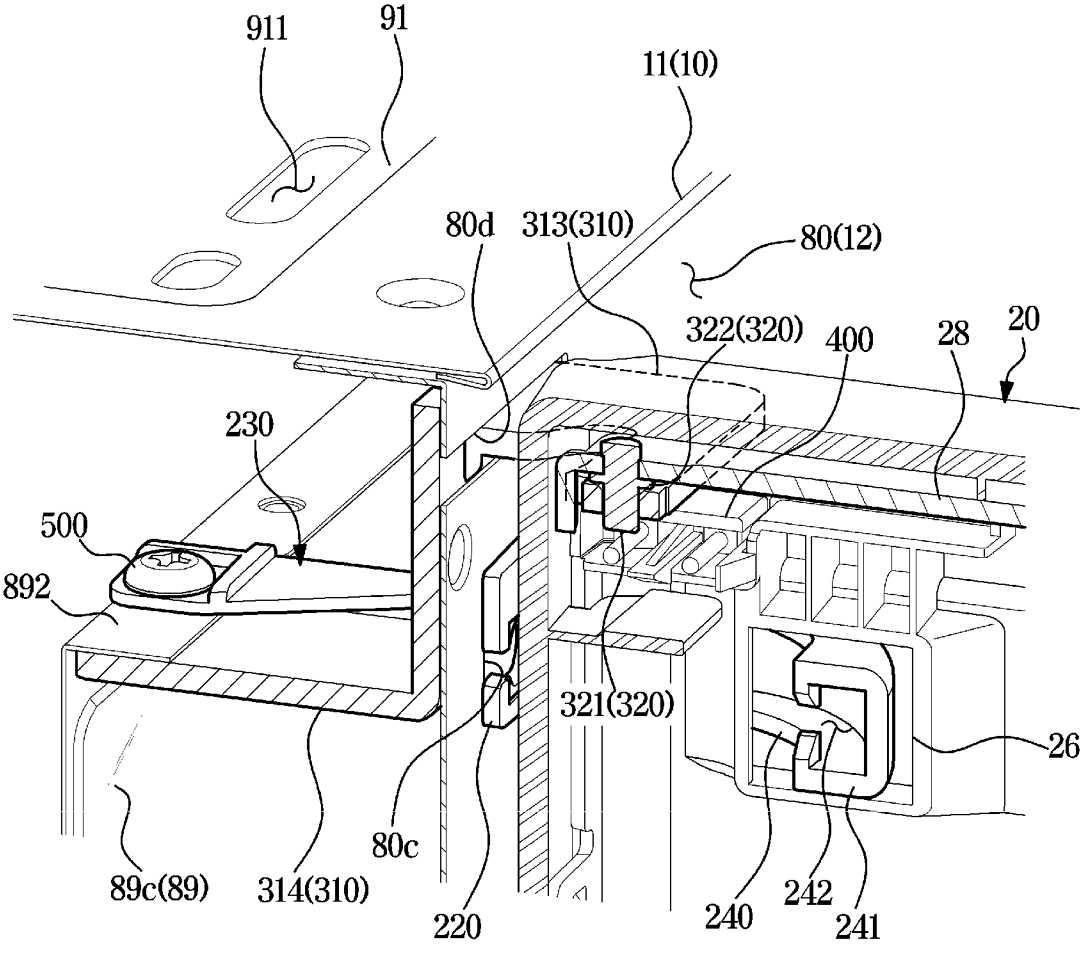
FIG. 14 is a cross-sectional view taken along line B-B' illustrated in FIG. 12.
Figure 15:
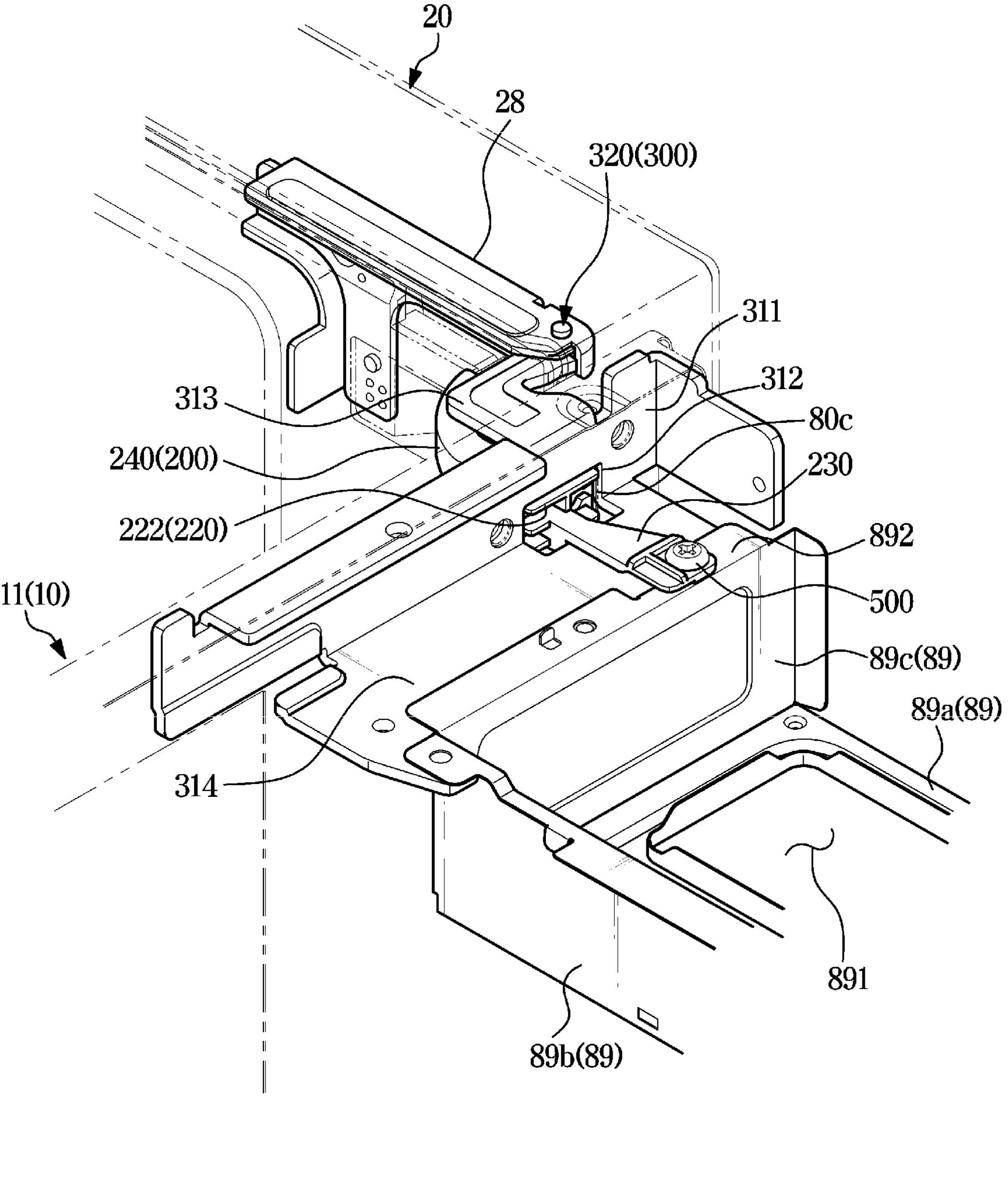
FIG. 15 is a view illustrating a hinge device of the cooking apparatus according to an embodiment of the disclosure.
Figure 16:
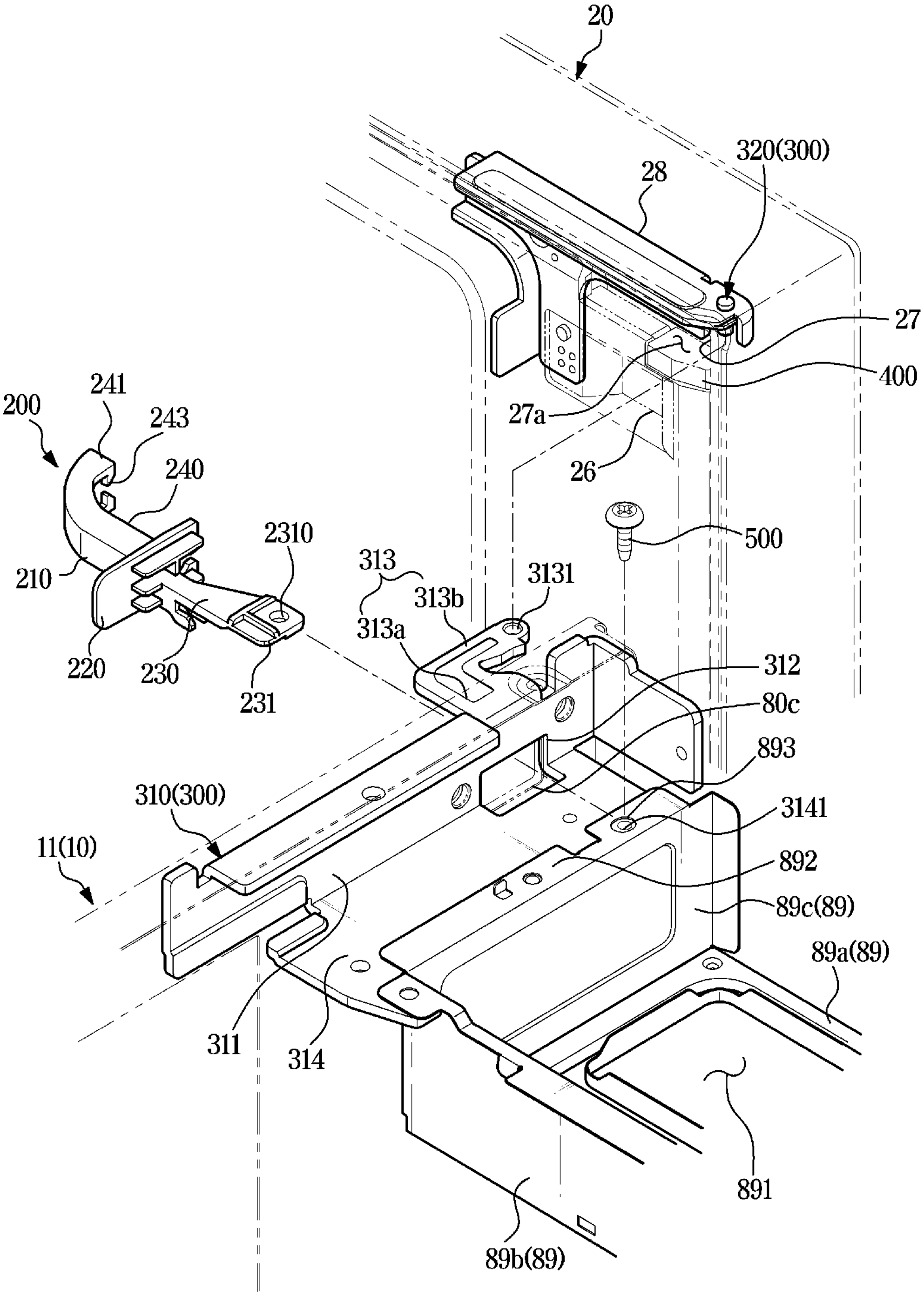
FIG. 16 is an exploded view illustrating the hinge device illustrated in FIG. 15.
Figure 17:
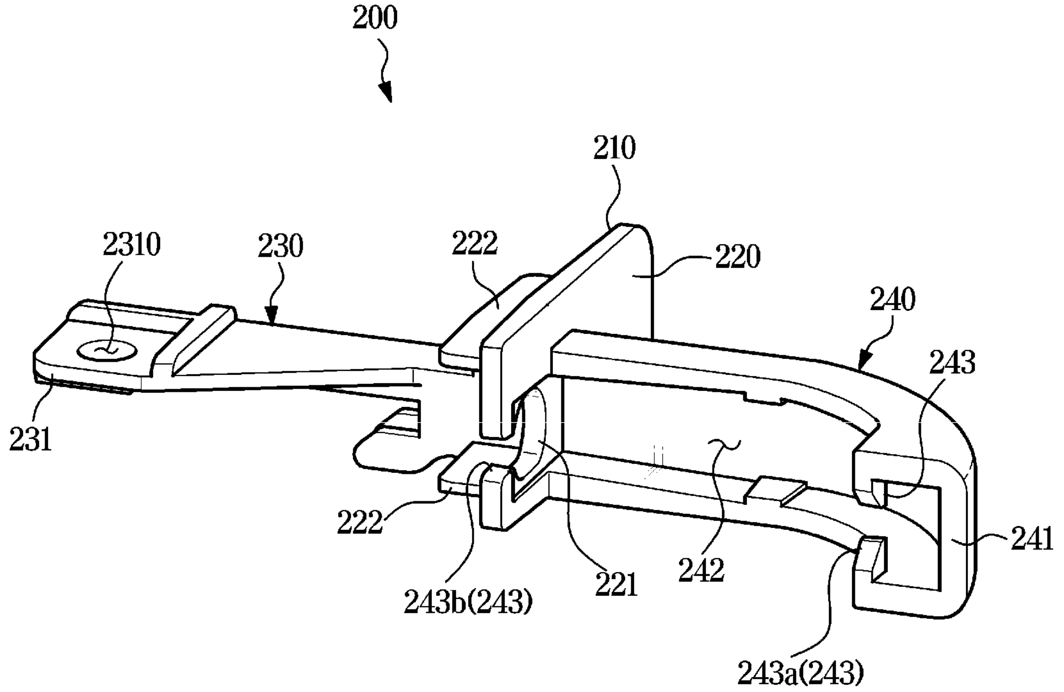
FIG. 17 is a view illustrating a wire cover of the cooking apparatus according to an embodiment of the disclosure.

FIG. 10 is a view illustrating a state in which a control unit is coupled to a main body of the cooking apparatus according to an embodiment of the disclosure. FIG. 11 is an exploded perspective view illustrating a door, the control unit, and the main body of the cooking apparatus according to an embodiment of the disclosure. FIG. 12 is a view illustrating a state in which the door of the cooking apparatus according to an embodiment of the disclosure is opened. FIG. 13 is an enlarged view illustrating a part A illustrated in FIG. 12. FIG. 14 is a cross-sectional view taken along line B-B' illustrated in FIG. 12. FIG. 15 is a view illustrating a hinge device of the cooking apparatus according to an embodiment of the disclosure. FIG. 16 is an exploded view illustrating the hinge device illustrated in FIG. 15. FIG. 17 is a view illustrating a wire cover of the cooking apparatus according to an embodiment of the disclosure.

Referring to FIGS. 11 and 12, the cooking apparatus 1 may include the main body 10 and the door 20.

The main body 10 may include the outer housing 11 and the inner housing 12 provided inside the outer housing 12.

The inner housing 12 may include the front plate 80. The front plate 80 may form the front surface of the main body 10. The front plate 80 may form one surface of the main body 10 facing the door 20.

The front plate 80 may include a plurality of openings. The front plate 80 may include a first opening 80*a* communicating with the cooking chamber 30. The front plate 80 may include a second opening 80*b* communicating with the electronic equipment chamber 60. The front plate 80 may include a third opening 80*c* provided to accommodate a part of a wire cover 200 to be described later. The front plate 80 may include a fourth opening 80*d* provided to receive a portion of a hinge bracket 310 to be described later.

The main body 10 may include the side bracket 89. Referring to FIGS. 6, 7 and 9, the side bracket 89 may be arranged above the first circulation fan 41 to guide the air introduced through the first circulation air intake 14. The side bracket 89 may include the first communication hole 891 for guiding the introduced air to move upward. The side bracket 89 may include a first surface 89*a* provided to face the bottom plate 97. The side bracket 89 may include a second surface 89*b* extending substantially vertically from the first surface 89*a* and coupled to the upper surface plate 81. The side bracket 89 may include a third surface 89*c* extending substantially vertically from the first surface 89*a* and provided to face the front plate 80.

The side bracket 89 may include a flange 892 bent forward from the third surface 89*c*. The flange 892 may be provided to be coupled to the wire cover 200 and the hinge bracket 310 to be described later. The flange 892 may include a flange hole 893 to be coupled to the wire cover 200 and the hinge bracket 310. For example, the flange 892, the wire cover 200, and the hinge bracket 310 may be provided to be screwed to each other. However, it is not limited thereto, and various coupling methods may be applied thereto.

The door 20 may be configured to open and close the front plate 80. Particularly, the door 20 may be configured to open and close the first opening 80*a* formed in the front plate 80. That is, the door 20 may open and close the cooking chamber 30. For example, the door 20 may open and close the front plate 80 while rotating by a hinge device 300 to be described later.

Referring to FIG. 13, a door opening 26, through which a wire W passes, may be formed on a rear surface 22 of the door 20. The door opening 26 may be provided to accommodate a part of the wire cover 200 to be described later.

A hinge receiver 27 provided to accommodate a part of the hinge device 300 to be described later may be formed on the rear surface 22 of the door 20. A reception space 27*a* may be provided in the hinge receiver 27 to allow the hinge bracket 310 of the hinge device 300, to be described later, to be rotatable.

In addition, the door 20 may include a connection bracket 28 arranged therein. The connection bracket 28 may fix a hinge shaft 320 of the hinge device 300 to be described later to the inside of the door 20.

The door 20 may include a manipulator 25 configured to receive a user command (refer to FIG. 2). A user may select a cooking mode, and a cooking time through the manipulator 25 provided on the door 20. For example, the manipulator 25 may include a display panel (not shown), and a touch panel (not shown). The manipulator 25 may include a circuit board (not shown) to perform an electrical operation. The circuit board of the manipulator 25 may be electrically connected to a circuit board (not shown) accommodated in the control unit 100.

In the cooking apparatus 1, the wire W may be provided for electrical connection between components. The wire W may be provided in plurality.

For example, the wire W may include a first wire W1 provided on the door 20 side and a second wire W2 provided on the main body 10 side. The first wire W1 may be provided in the door 30 to be directed to the main body 10. The first wire W1 may be out from the inside of the door 20 and be inserted into the main body 10.

The first wire W1 may be referred to as a door-side wire W1, and the second wire W2 may be referred to as a body-side wire W2.

The first wire W1 may be provided to be electrically connected to the second wire W2. The first wire W1 and the second wire W2 may be connected to exchange signals with each other. For example, a connector W11 provided at one end of the first wire W1 may be electrically connected to a connector W21 provided at one end of the second wire W2.

A first end of the first wire W1 may be connected to the manipulator 25 of the door 20. For example, the first end may be connected to a circuit board (not shown) provided on the manipulator 25 of the door 20. A second end of the first wire W1 may be connected to the second wire W2.

A first end of the second wire W2 may be connected to the first wire W1. A second end of the second wire W2 may be connected to the control unit 100. Particularly, the second end of the second wire W2 may be provided to be connected to the circuit board (not shown) accommodated in the control unit 100.

By the connection of the wires W, the control unit 100 may receive a signal from the manipulator 25 of the door 20 to control internal components of the cooking apparatus 1. The control unit 100 may control the electronic component according to a user command input to the manipulator 25.

A service hole 912 (refer to FIG. 19) may be formed on the upper surface of the main body 10. The service panel 91 may be provided on the upper surface of the main body 10 to open and close the service hole 912. The service panel 91 may be removably mounted to the main body 10 to open and close the service hole 912. For example, the service panel 91 may include a fastening hole 917. Details thereof will be described later.

The service hole 912 and the service panel 91 may be provided for maintenance and repair of components forming the cooking apparatus 1. Particularly, by separating the service panel 91 from the main body 10, the service hole 912 may be opened. It may be possible to enter into the main body 10 of the cooking apparatus 1 through the open service hole 912.

By detaching the service panel 91 from the main body 10 to open the service hole 912, it is possible to access the wire W provided in the main body 10. By entering the inside of the main body 10 through the open service hole 912, it is possible to easily release the connection between the wires W electrically connected to each other inside the main body 10. That is, it is possible to easily release the connection between the first wire W1 and the second wire W2.

Meanwhile, referring to FIG. 1, in a state in which the cooking apparatus 1 is installed in the upper cabinet 3*a*, the service panel 91 may be provided to communicate with the outside. That is, the service panel 91 may be provided to be exposed without being covered by the upper cabinet 3*a*. Accordingly, it is possible to easily access the inside of the main body 10 through the service panel 91 without taking the cooking apparatus 1 out of the upper cabinet 3*a*.

In addition, in a state in which the cooking apparatus 1 is installed in the upper cabinet 3*a*, the discharge panel 92, the cooling air outlet 93, and the suction grille 120 may also be provided to communicate with the outside. That is, the discharge panel 92, the cooling air outlet 93, and the suction grille 120 may be provided to be exposed without being covered by the upper cabinet 3*a*. Accordingly, air intake and discharge of the cooking apparatus 1 may be smoothly performed, and the flow of air may not be obstructed by a cabinet or the like.

In general, it is required to disassemble the door from the main body for providing a service for the cooking apparatus service. The cooking apparatus service may refer to all operations involved for maintenance, repair, or removal of the cooking apparatus. In order to disassemble the door from the main body, disconnecting the wire in the door from the wire in the main body may be preceded. As for the OTR, because the OTR is located in the upper portion of the cooking space, it is required to take the product out of the cabinet for completely disassembling the main body. That is, it may take a lot of work time and manpower to provide the cooking apparatus service.

As for the cooking apparatus 1 according an embodiment of the disclosure, by simply separating the service panel 91 from the main body 10, the cooking apparatus service may be smoothly performed. For example, it is possible to enter the inside of the main body 10 through the open service hole 912, and it is possible to easily release the electrical connection between the first wire W1 and the second wire W2. That is, there is no need to take the entire cooking apparatus 1 out of the cabinet 3 and completely disassemble the main body 10 when providing the cooking apparatus service. Accordingly, it is possible to reduce the time and manpower required for providing the cooking apparatus service. In addition, the use convenience may be significantly improved.

As described above, the service panel 91 may include the first circulation air outlet 911. The polluted air introduced into the main body 10 through the first circulation air intake 14 and the second circulation air intake 15 formed on the lower surface of the main body 10 may be filtered by the filter. The filtered air may be discharged to the outside of the cooking apparatus 1 through the first circulation air outlet 911 formed in the service panel 91. The filtered air may be discharged to the outside of the cooking apparatus 1 through the second circulation air outlet 921 formed in the discharge panel 92.

Referring to FIGS. 12 to 17, the cooking apparatus 1 may include the wire cover 200 provided to cover the wire W. The wire cover 200 may cover the wire W exposed between the door 20 and the main body 10, and thus the aesthetics of the cooking apparatus 1 may be improved.

The wire cover 200 may include a wire cover body 210 forming an exterior of the wire cover 200. The wire cover body 210 may include a cover supporter 220, a body coupler 230, and a wire guide member 240.

The wire cover 200 may include the cover supporter 220 provided to support the third opening 80*c* formed in the main body 10. For example, the cover supporter 220 may have a larger area than an open area of the third opening 80*c*. Accordingly, the cover supporter 220 may prevent the entire wire cover 200 from entering the main body 10 through the third opening 80*c*. That is, the cover supporter 220 may prevent the wire cover 200 from being separated from a position thereof.

A body mount 222 extending rearwardly from the cover supporter 220 may be provided in the cover supporter 220. The body mount 222 may be provided to be inserted into the third opening 80*c*. The body mount 222 may allow the wire cover 200 to be stably fixed to the third opening 80*c*.

The cover supporter 220 may include a wire through hole 221. That is, the cover supporter 220 may form a hole through which the first wire W1, which is directed to the inside of the main body 10 from the inside of the door 20, passes. The wire through hole 221 may be provided to communicate with the third opening 80*c*. The first wire W1 guided through the wire cover 200 may be inserted into the main body 10 by passing through the wire through hole 221 and the third opening 80*c*.

The body coupler 230 may be provided to be coupled to the main body 10. The body coupler 230 may be a portion extending from one side of the cover supporter 220. The body coupler 230 may extend rearwardly from one side of the cover supporter 220. The body coupler 230 may include a substantially plate shape.

For example, the body coupler 230 may include a body coupling hole 2310. The body coupling hole 2310 may be screwed to the flange hole 893 formed in the flange 892 of the side bracket 89. The body coupling hole 2310 may be screwed to a coupling hole 3141 formed in the hinge bracket 310. However, it is not limited thereto and various coupling methods may be applied thereto.

The wire guide member 240 may be provided to guide the first wire W1 that is directed from the door 20 to the inside of the main body 10. The wire guide member 240 may be arranged between the door 20 and the main body 10 to cover the first wire W1.

The wire guide member 240 may be a portion extending from the other side of the cover supporter 220. The wire guide member 240 may extend forwardly from the other side of the cover supporter 220. The wire guide member 240 may include a guide space 242 that is formed by cutting a portion of the wire guide member 240. The first wire W1 may be accommodated in the guide space 242 and guided toward the main body 10.

The wire guide member 240 may be provided to be accommodated in the door opening 26 formed on the rear surface 22 of the door 20. For example, the wire guide member 240 may be inserted into or withdrawn from the door 20 through the door opening 26 according to the opening and closing of the door 20. However, this means that at least a portion of the wire guide member 240 is accommodated in the door 20 or is not accommodated in the door 20 according to the rotation (movement) of the door 20. That is, the wire guide member 240 is maintained in a state of being coupled to the main body 10 and does not become a subject of movement.

The wire guide member 240 may include a curved shape. Accordingly, the wire cover 200 may be provided so as not to interfere with the door 20 in response the opening or closing of the door 20.

An end of the body coupler 230 may be provided as a first end 231 of the wire cover 200. An end of the wire guide member 240 may be provided as a second end 241 of the wire cover 200. That is, the first end 231 of the wire cover 200 may be provided to be coupled to the main body 10, and a second end 232 of the wire cover 200 may be accommodated inside the door 20 through the door opening 26 according to the opening and closing of the door 20.

Further, the wire cover 200 may include a locking member 243. In a state in which the first wire W1, which is accommodated in the guide space 242 of the wire cover 200, is inserted into the main body 10 through the wire through hole 221, the locking member 243 may prevent the first wire W1 from being separated from the wire cover 200. Accordingly, the wire cover 200 may more reliably prevent the exposure of the first wire W1. For example, even when an external impact is applied to the wire cover 200, the wire cover 200 may prevent the first wire W1 from being separated from the wire cover 200 and prevent the first wire W1 from being exposed between the door 20 and the main body 10.

For example, the locking member 243 may include a first locking member 243*a* provided in at least a portion of the guide space 242 and a second locking member 243*b* provided in at least a portion of the wire through hole 221. In FIG. 17, the first locking member 243*a* and the second locking member 243*b* are illustrated. However, the shape, position and the number of the locking members is not limited thereto as long as the locking member is provided to prevent the separation of the first wire W1.

Referring to FIGS. 13 to 16, the cooking apparatus 1 may include the hinge device 300. The hinge device 300 may rotatably couple the door 20 to the main body 10. That is, the door 20 may be rotated through the hinge device 300 so as to open and close the main body 10.

The hinge device 300 may include the hinge bracket 310 and the hinge shaft 320. The hinge bracket 310 may be provided to be rotated about the hinge shaft 320.

The hinge bracket 310 may be coupled to the inside of the main body 10 and protrude toward the door 20.

The hinge bracket 310 may include a front body 311 provided to face the front plate 80. A hinge opening 312 corresponding to the third opening 80*c* may be formed in the front body 311. The hinge opening 312 may communicate with the third opening 80*c*.

The hinge bracket 310 may include a hinge protrusion 313 extending from the front body 311 and protruding toward the outside of the main body 10.

The hinge protrusion 313 may protrude to the outside of the main body 10 by passing through the fourth opening 80*d* formed in the front plate 80. The hinge protrusion 313 may be coupled to the hinge shaft 320 inside the door 20. The hinge protrusion 313 may be provided to be accommodated in the hinge receiver 27 according to the opening and closing of the door 20.

For example, the hinge protrusion 313 may include a first protrusion 313*a* bent forward from the front body 311, and a second protrusion 313*b* extending from the first protrusion 313*a* toward the hinge shaft 320 provided inside the door 20.

The second protrusion 313*b* may be rotatably coupled to the hinge shaft 320. The second protrusion 313*b* may include a rotation hole 3131 provided to be coupled to the hinge shaft 320. For example, a diameter of the rotation hole 3131 may be greater than or equal to a diameter of a hinge shaft body 321 of the hinge shaft 320. Accordingly, in the process of disassembling the door 20 to be described later, it is possible pull the hinge shaft 320 out from the rotation hole 3131 by lifting the door 20 (refer to FIG. 25).

The hinge bracket 310 may include a hinge coupler 314 extending rearwardly from the front body 311 to be coupled to the main body 10. For example, the hinge coupler 314 may be coupled to the flange 892 of the side bracket 89. The hinge coupler 314 may be coupled to the main body coupler 230 of the wire cover 200. The hinge coupler 314 may include the coupling hole 3141. The coupling hole 3141 may be provided to correspond to the flange hole 893 of the flange 892 and the body coupling hole 2310 of the wire cover 200. The coupling hole 3141, the flange hole 893, and the body coupling hole 2310 may be screwed to each other by a fastening member 500. However, it is not limited thereto, and various coupling methods may be applied thereto.

The hinge shaft 320 may form a rotation center of the hinge bracket 310. The hinge shaft 320 may be arranged inside the door 20. The hinge shaft 320 may be arranged in the reception space 27*a* formed on the rear surface 22 of the door 20. The hinge shaft 320 may be fixed to the inside of the door 20 by the connection bracket 28.

The hinge shaft 320 may include the hinge shaft body 321 and an extension 322 extending radially outward from the hinge shaft body 321. That is, a diameter of the extension 322 may be greater than a diameter of the hinge shaft body 321. The extension 322 may be supported by an upper surface of the hinge protrusion 313 of the hinge bracket 310.

Meanwhile, referring to FIG. 13, the door 20 may further include a door cap 400 removably mounted on the rear surface of the door 22. The door cap 400 may cover the rear surface 22 of the door to prevent components provided inside the door 20 from being seen. The door cap 400 may improve the aesthetics of the cooking apparatus 1.

The door cap 400 may be arranged adjacent to the hinge device 300. The door cap 400 may be arranged under the hinge device 300. The door cap 400 may prevent the separation of the hinge device 300. Particularly, in response to lifting the hinge shaft 320, the coupling between the hinge bracket 310 and the hinge shaft 320 may be released, and at this time, the hinge protrusion 313 may be locked by the door cap 400. That is, the door cap 400 may prevent the door 20 from being separated from the main body 10 by preventing the hinge device 300 from being separated. Accordingly, the door 20 may not be easily separated from the main body 10 under normal circumstances. However, for providing the service for the cooking apparatus 1, the door 20 may be easily separated from the main body 10 by separating the door cap 400 from the rear door 22.

Figure 18:
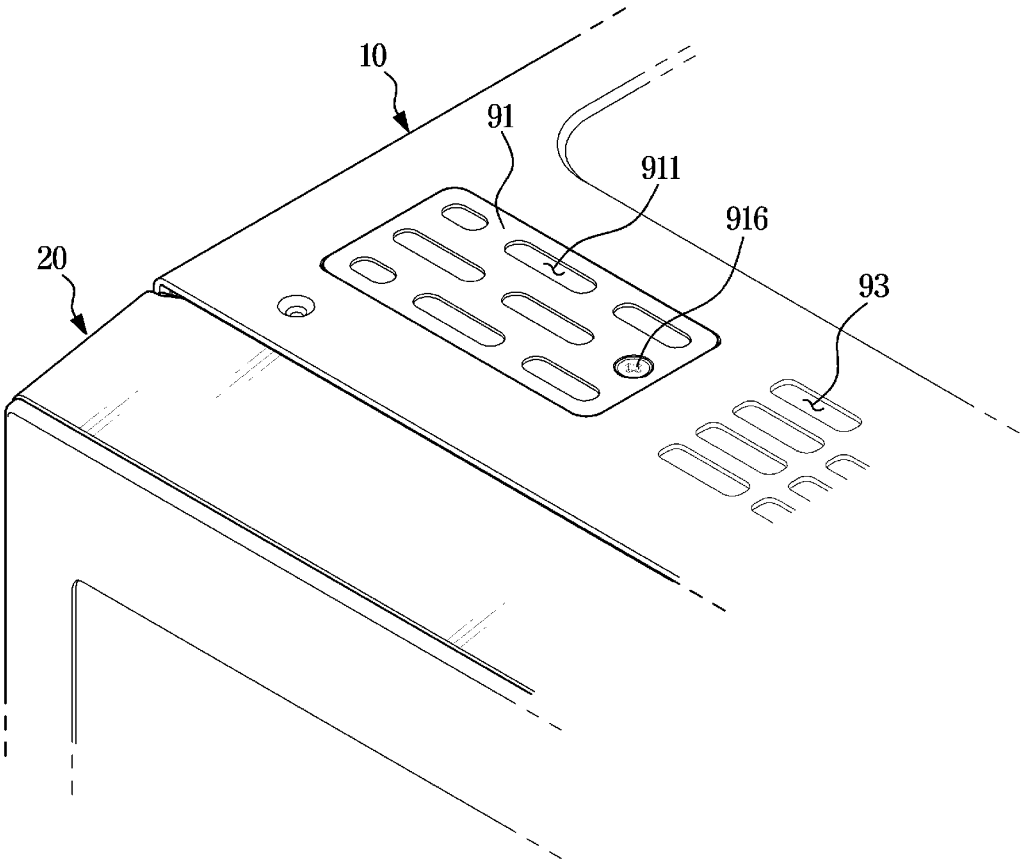
FIG. 18 is an enlarged view illustrating a service panel of the cooking apparatus according to an embodiment of the disclosure.
Figure 19:
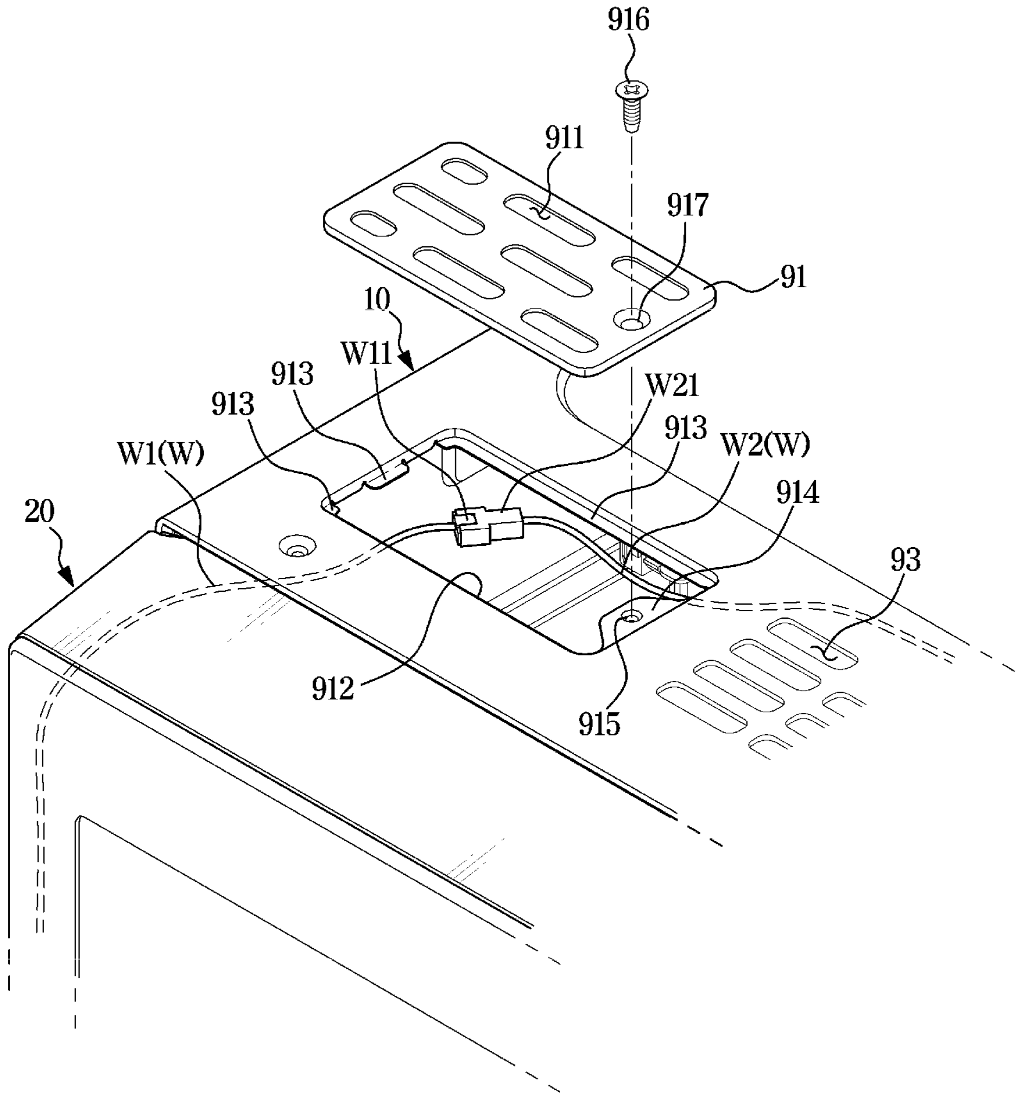
FIG. 19 is a view illustrating a state in which the service panel illustrated in FIG. 18 is separated from the main body.
Figure 20:
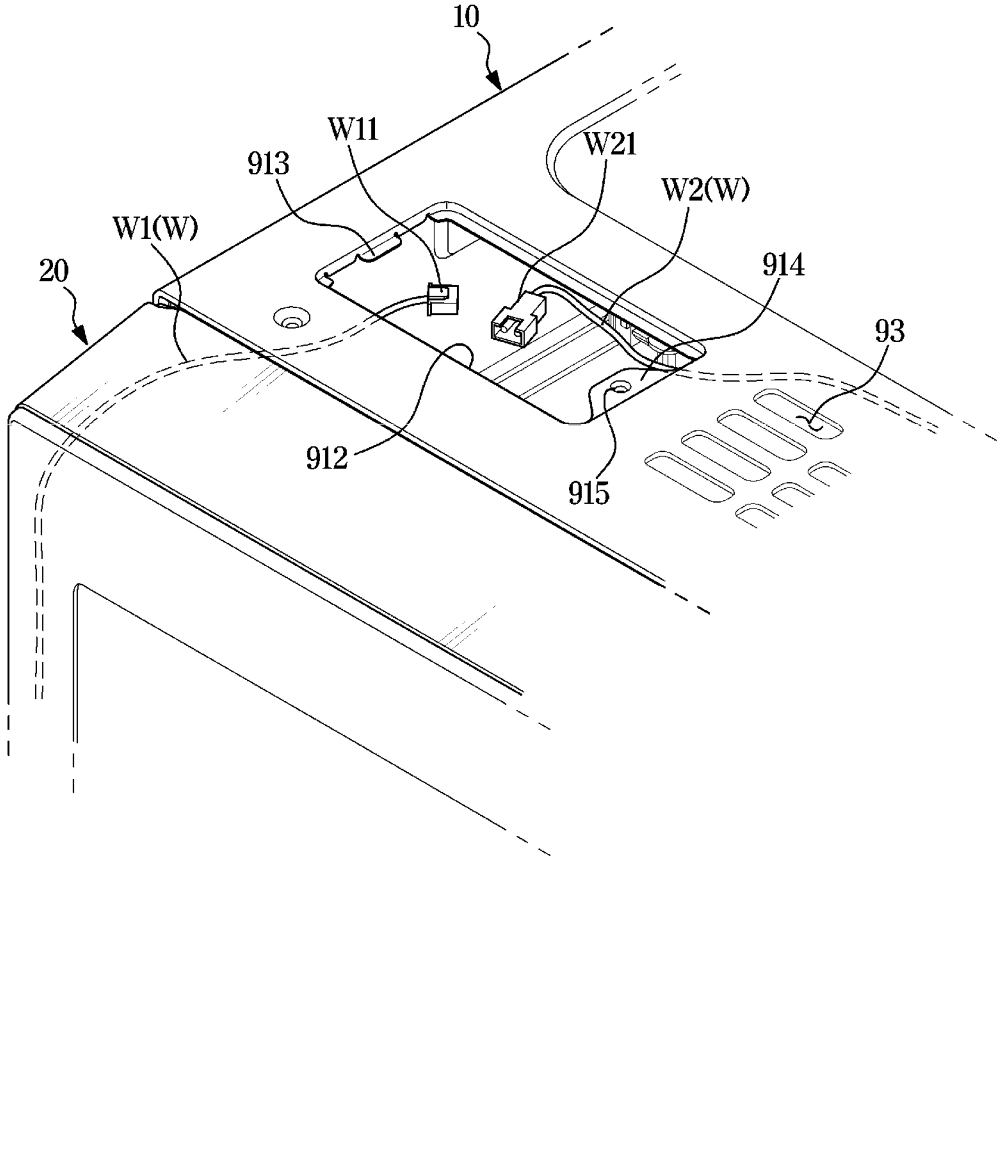
FIG. 20 is a view illustrating a state in which connection between the wires illustrated in FIG. 19 is released.
Figure 21:
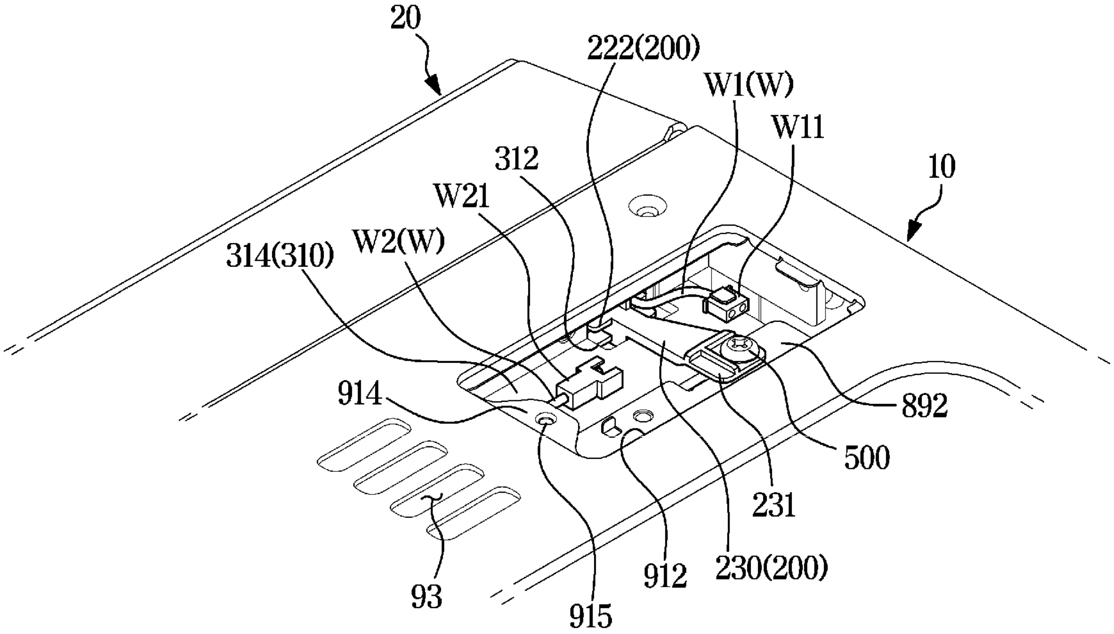
FIG. 21 is a view illustrating the state illustrated in FIG. 20 from other direction.
Figure 22:
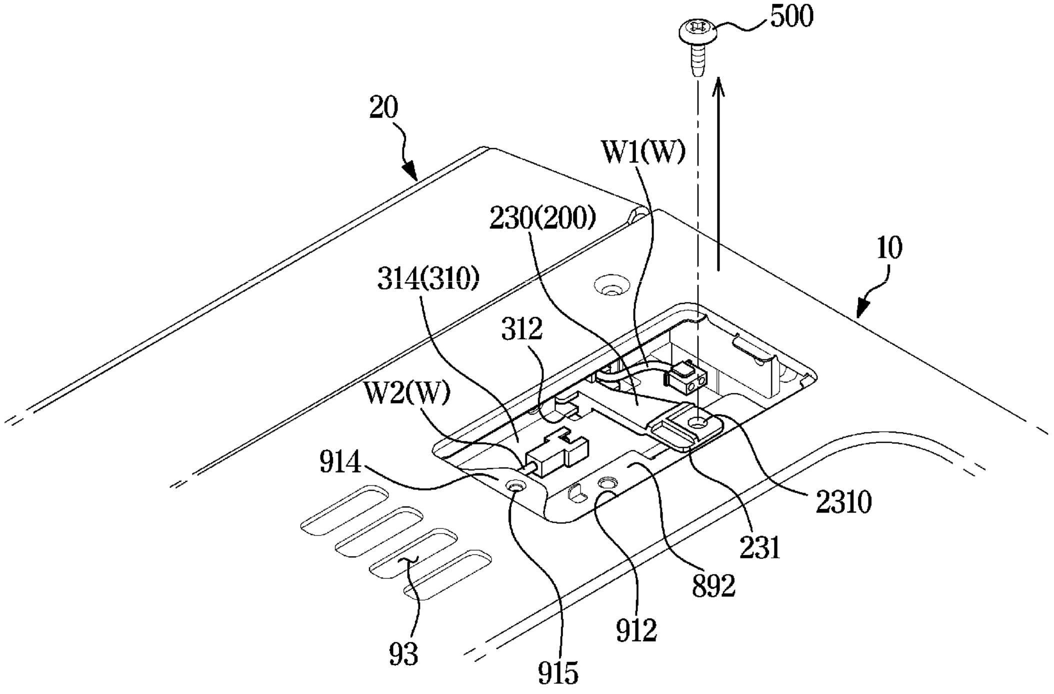
FIG. 22 is a view illustrating a state in which coupling between the wire cover and the main body illustrated in FIG. 21 is released.
Figure 23:
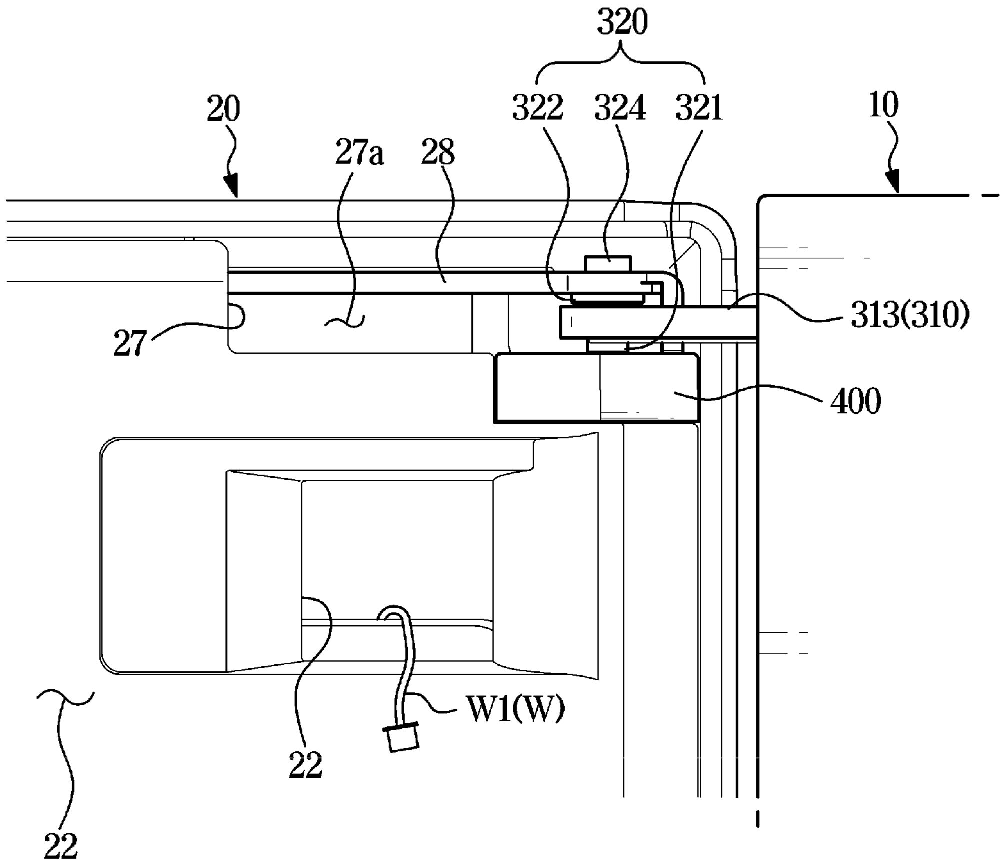
FIG. 23 is a view illustrating a state in which the door is opened after the wire cover illustrated in FIG. 22 is disassembled from the main body.
Figure 24:
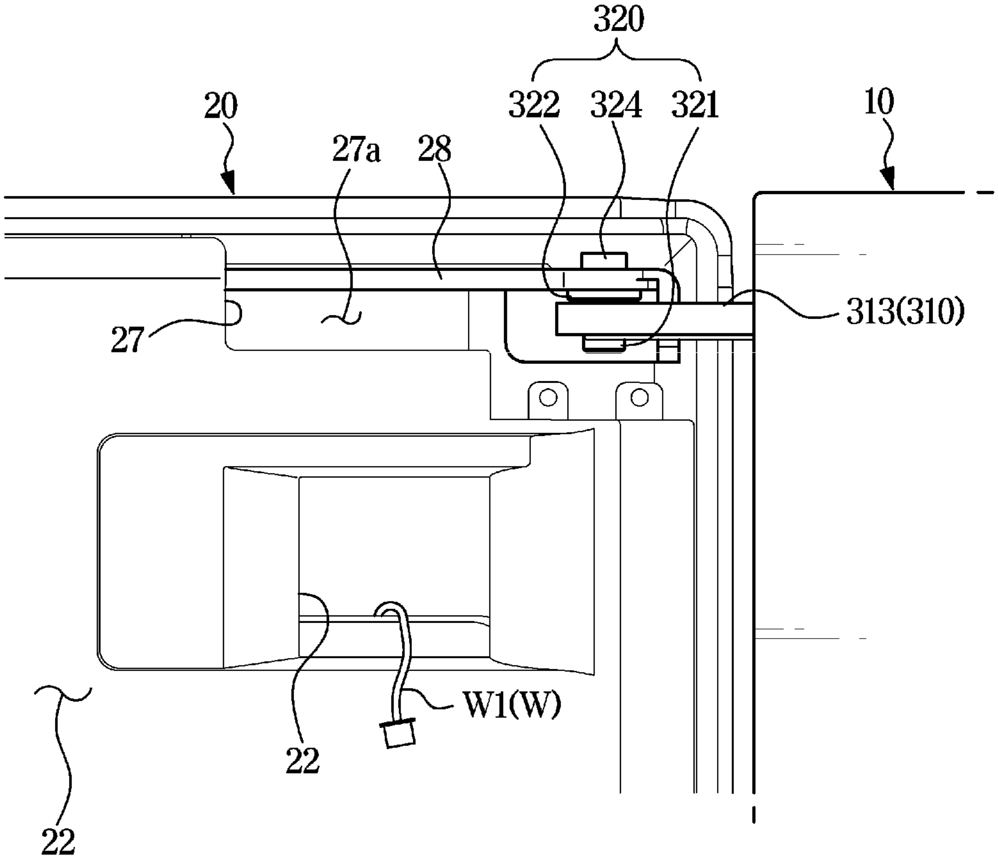
FIG. 24 is a view illustrating a state in which a door cap illustrated in FIG. 23 is disassembled.
Figure 25:
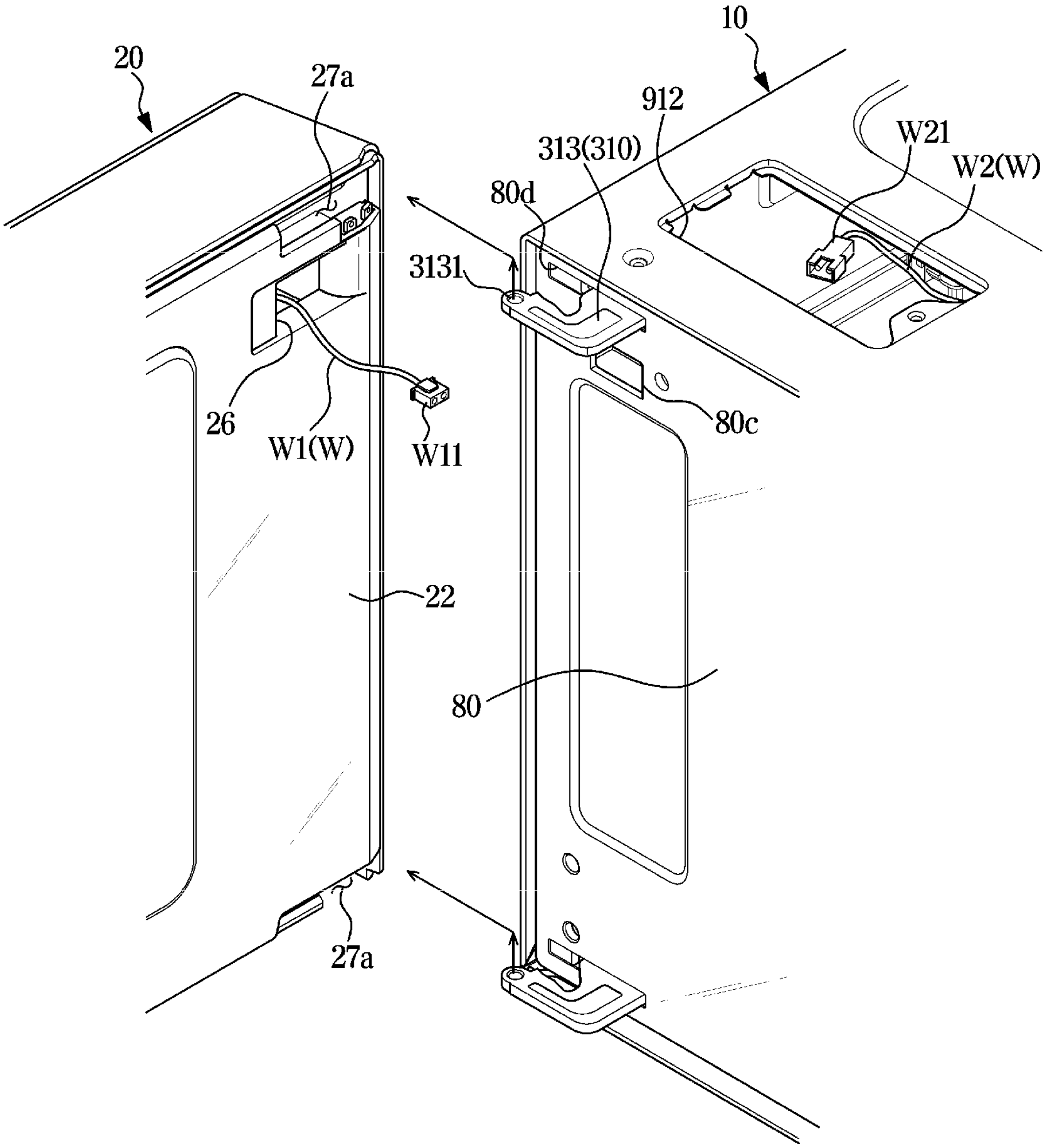
FIG. 25 is a view illustrating a state in which the door of the cooking apparatus according to an embodiment of the disclosure is separated from the main body.

FIG. 18 is an enlarged view illustrating a service panel of the cooking apparatus according to an embodiment of the disclosure. FIG. 19 is a view illustrating a state in which the service panel illustrated in FIG. 18 is separated from the main body. FIG. 20 is a view illustrating a state in which connection between the wires illustrated in FIG. 19 is released. FIG. 21 is a view illustrating the state illustrated in FIG. 20 from other direction. FIG. 22 is a view illustrating a state in which coupling between the wire cover and the main body illustrated in FIG. 21 is released. FIG. 23 is a view illustrating a state in which the door is opened after the wire cover illustrated in FIG. 22 is disassembled from the main body. FIG. 24 is a view illustrating a state in which a door cap illustrated in FIG. 23 is disassembled. FIG. 25 is a view illustrating a state in which the door of the cooking apparatus according to an embodiment of the disclosure is separated from the main body.

A process of disassembling the main body 10 and the door 20 will be described with reference to FIGS. 18 to 25.

The service panel 91 may be removably mounted on the upper surface of the main body 10 to cover the service hole 912. The service panel 91 may include the fastening hole 917.

Referring to FIG. 19, a seating portion 913 on which the service panel 91 is stably mounted may be provided in at least a portion of a rim of the service hole 912. Further, a panel coupler 914 for coupling with the service panel 91 may be provided in at least a portion of the rim of the service hole 912. A panel coupling hole 915 may be formed in the panel coupler 914.

The fastening hole 917 of the service panel 91 may be provided to correspond to the panel coupling hole 915. For example, the fastening hole 917 and the panel coupling hole 915 may be provided to be screwed to each other by a fastening member 916. However, it is not limited thereto, and various coupling methods may be applied thereto.

Meanwhile, hereinafter for convenience of description, the fastening member 916 may be referred to as a first fastening member 916, and the fastening member 500 may be referred to as a second fastening member 500.

Referring to FIG. 19, the service panel 91 may be disassembled from the main body 10 by releasing the coupling of the first fastening member 916. Accordingly, the service hole 912 formed on the upper surface of the main body 10 may be opened. As the service hole 912 is opened, it may be easier to enter the main body 10.

It is possible to enter the main body 10 through the open service hole 912 so as to access the internal component of the cooking apparatus 1. For example, it is possible to release an electrical connection between wires. As illustrated in FIG. 20, the connection between the first wire W1 and the second wire W2 may be released. Accordingly, the electrical connection between the circuit board accommodated in the door and the circuit board accommodated in the control unit may be released.

Referring to FIG. 21, it is possible to access the wire cover 200 or the hinge device 300 coupled to the main body 10 through the opened service hole 912. For example, referring to FIG. 22, by releasing the coupling of the second fastening member 500, it is possible to release the coupling among the wire cover 200, the hinge bracket 310 and the flange 892 of the side bracket 89.

FIG. 23 illustrates the rear surface 22 of the door 20 after the coupling among the wire cover 200, the hinge bracket 310 and the flange 892 is released. The first wire W1 disconnected from the second wire W2 may be provided inside the door opening 26. In this state, as illustrated in FIG. 24, the door cap 400 may be separated from the rear surface 22 of the door 20. Accordingly, because movement of the hinge device 300 is not limited by the door cap 400, the door 20 may be in a state of being detachable from the main body 10.

Referring to FIG. 25, the door 20 may be separated from the main body 10 by lifting the entire door 20 in a state in which the connection between the first wire W1 and the second wire W2 is released, the wire cover 200 is disassembled from the main body 10, and the door cap 400 is disassembled from the door 20 as illustrated in FIG. 24.

As is apparent from the above description, a cooking apparatus may include an improved structure to easily disconnect wires.

A cooking apparatus may allow maintenance without disassembling an entire main body.

A cooking apparatus may improve the aesthetics by covering a wire.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking apparatus comprising:
a main body comprising a cooking chamber;
an upper surface of the main body having a service hole formed thereon;
a door configured to open and close the cooking chamber of the main body;
a wire insertable into the main body from an inside of the door, the wire configured to electrically connect components of the cooking apparatus; and
a service panel mountable to and removable from the main body so as to allow the service hole to be opened and closed,
wherein while the wire is inserted into the main body, the wire is accessible through the service hole.

2. The cooking apparatus of claim 1, further comprising:
a wire cover to cover the wire exposed between the door and the main body.

3. The cooking apparatus of claim 1, wherein
the door comprises a door opening formed on a rear surface of the door to allow the wire to pass therethrough,
wherein an end of the wire cover is coupled to the main body, and another end of the wire cover is inserted into or withdrawn from the inside of the door through the door opening based on the opening and closing of the door.

4. The cooking apparatus of claim 1, wherein the wire corresponds to a first wire, wherein the main body accommodates a second wire connected to the first wire and configured to exchange a signal with the first wire.

5. The cooking apparatus of claim 4, wherein the door further comprises a manipulator configured to receive a user command, wherein the an end of the first wire is connectable to the manipulator and another end of the first wire is connectable to the second wire.

6. The cooking apparatus of claim 4, further comprising: a control assembly arranged in front of the main body and adjacent to an electronic equipment chamber formed inside the main body, wherein an end of the second wire is connectable to the first wire and another end of the second wire is connectable to the control assembly.

7. The cooking apparatus of claim 4, wherein the first wire and the second wire is separable from each other through the service hole.

8. The cooking apparatus of claim 1, wherein the main body further comprises:

a circulation air inlet formed on a lower surface of the main body to suction air; and a filter configured to filter the air suctioned through the circulation air inlet, wherein the service panel further comprises a circulation air outlet provided to discharge the air that passes through the filter.

9. The cooking apparatus of claim 8, wherein the main body further comprises an electronic equipment chamber and a cooling air inlet formed on the upper surface of the main body to suction air for cooling the electronic equipment chamber, wherein the cooling air inlet is arranged in front of the circulation air outlet.

10. The cooking apparatus of claim 9, wherein the cooling air inlet corresponds to a first cooling air inlet, and the cooking apparatus further comprises:

a second cooling air inlet formed on a front surface of the electronic equipment chamber to allow air, which is suctioned through the first cooling air inlet, to be introduced into the electronic equipment chamber;

a guide duct provided to allow the cooking chamber to communicate with the electronic equipment chamber so as to guide the air cooling the electronic equipment chamber to an inside of the cooking chamber; and a cooling air outlet formed on the upper surface of the main body to communicate with the cooking chamber so as to discharge the air cooling the cooking chamber.

11. The cooking apparatus of claim 2, wherein the wire cover comprises a curved shape so as not to interfere with the door.

12. The cooking apparatus of claim 2, further comprising: a hinge device configured to rotatably couple the door to the main body, wherein the hinge device comprises:

a hinge bracket provided on the main body to protrude toward the door; and a hinge shaft arranged inside the door and provided to form a rotation center of the hinge bracket by being rotatably coupled to the hinge bracket.

13. The cooking apparatus of claim 12, wherein the door further comprises a door cap arranged adjacent to the hinge device to prevent separation of the hinge device, the door cap coupleable to and decouple from the rear surface of the door.

14. The cooking apparatus of claim 12, wherein the hinge bracket is couplable to an end of the wire cover inside the main body.

15. The cooking apparatus of claim 12, wherein the hinge shaft further comprises a body and an extension formed to extend radially outward from an outer surface of the body, wherein the hinge bracket is rotatably coupled to the body of the hinge shaft and provided to support the extension.

* * * * *